United States Patent
Nishikawa et al.

(10) Patent No.: US 6,630,241 B1
(45) Date of Patent: Oct. 7, 2003

(54) RUBBER-STEEL CORD COMPOSITE AND PNEUMATIC TIRE FOR PASSENGER CARS

(75) Inventors: Tomohisa Nishikawa, Tokyo (JP); Kazuomi Kobayashi, Tokyo (JP); Kenji Matsuo, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/302,999

(22) Filed: Apr. 30, 1999

(30) Foreign Application Priority Data

| Apr. 30, 1998 | (JP) | ............................................ 10-121004 |
| May 1, 1998 | (JP) | ............................................ 10-122543 |
| May 1, 1998 | (JP) | ............................................ 10-122544 |
| May 1, 1998 | (JP) | ............................................ 10-122545 |

(51) Int. Cl.[7] ................................................. D02G 3/00
(52) U.S. Cl. ........................ 428/377; 428/373; 428/374; 428/379; 428/397; 428/295.1; 57/213
(58) Field of Search ................................ 428/373, 377, 428/374, 379, 397, 295.1; 57/213

(56) References Cited

U.S. PATENT DOCUMENTS

| 4,718,470 A | 1/1988 | Kusakabe et al. ........... 152/451 |
| 4,738,096 A | 4/1988 | Hatakeyama et al. ......... 57/206 |
| 4,836,262 A | 6/1989 | Nishizawa et al. .......... 152/451 |
| 4,966,216 A | * 10/1990 | Kawasaki et al. |
| 5,223,060 A | 6/1993 | Imamiya et al. ............. 152/451 |

FOREIGN PATENT DOCUMENTS

| EP | 0 822 105 | 2/1998 | .......... B60C/13/00 |
| JP | 56-131404 | 10/1981 | |
| JP | 59-1790 | 1/1984 | |
| JP | 60-38208 | 2/1985 | |

OTHER PUBLICATIONS

Eurpean Search Report dated Feb. 28, 2001.

* cited by examiner

*Primary Examiner*—Richard Weisberger
(74) *Attorney, Agent, or Firm*—Sughrue, Mion, Zinn Macpeak & Seas, PLLC

(57) ABSTRACT

A rubber-steel cord composite comprising a steel cord having, in a planar image of the steel cord formed by X-rays passing through the steel cord, a fraction R of the total area occupied by filaments of from 0.45 or more to 0.95 or less in an arbitrarily selected portion of the steel cord having a length of 15 mm in an axial direction of the cord, is provided. The length of 15 mm in an axial direction of the cord means a length of 15 mm in an axial direction of an actual cord and the fraction R of the total area occupied by the filaments is expressed as R=F/A, wherein A represents the total area of the cord and F represents the area of the cord occupied by the filaments.

An object of the present invention is to provide a pneumatic tire for passenger cars that shows no separation of the interface of adhesion during use, particularly during use in the run-flat condition, and exhibits excellent durability.

4 Claims, 14 Drawing Sheets

AXIAL DIRECTION OF THE CORD

F I G. 1
AXIAL DIRECTION OF THE CORD →
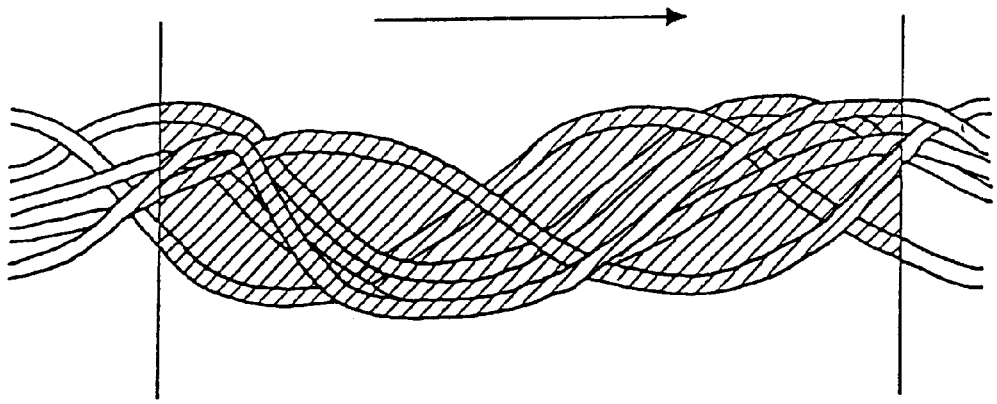
F I G. 2
AXIAL DIRECTION OF THE CORD →
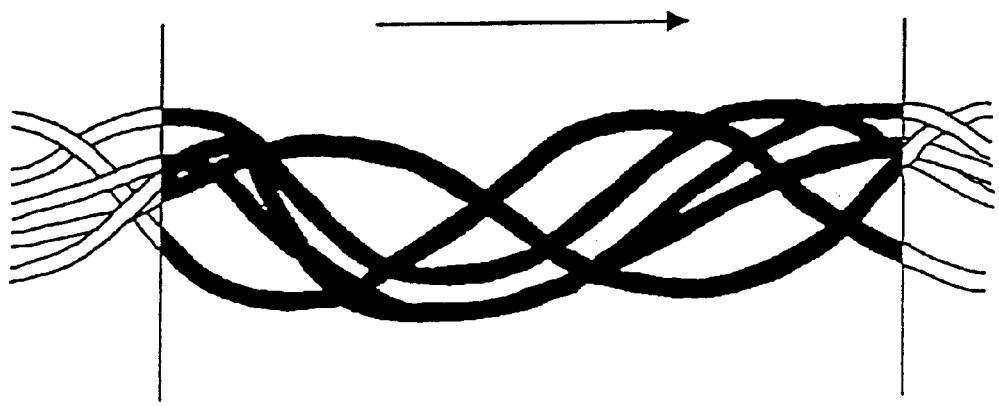

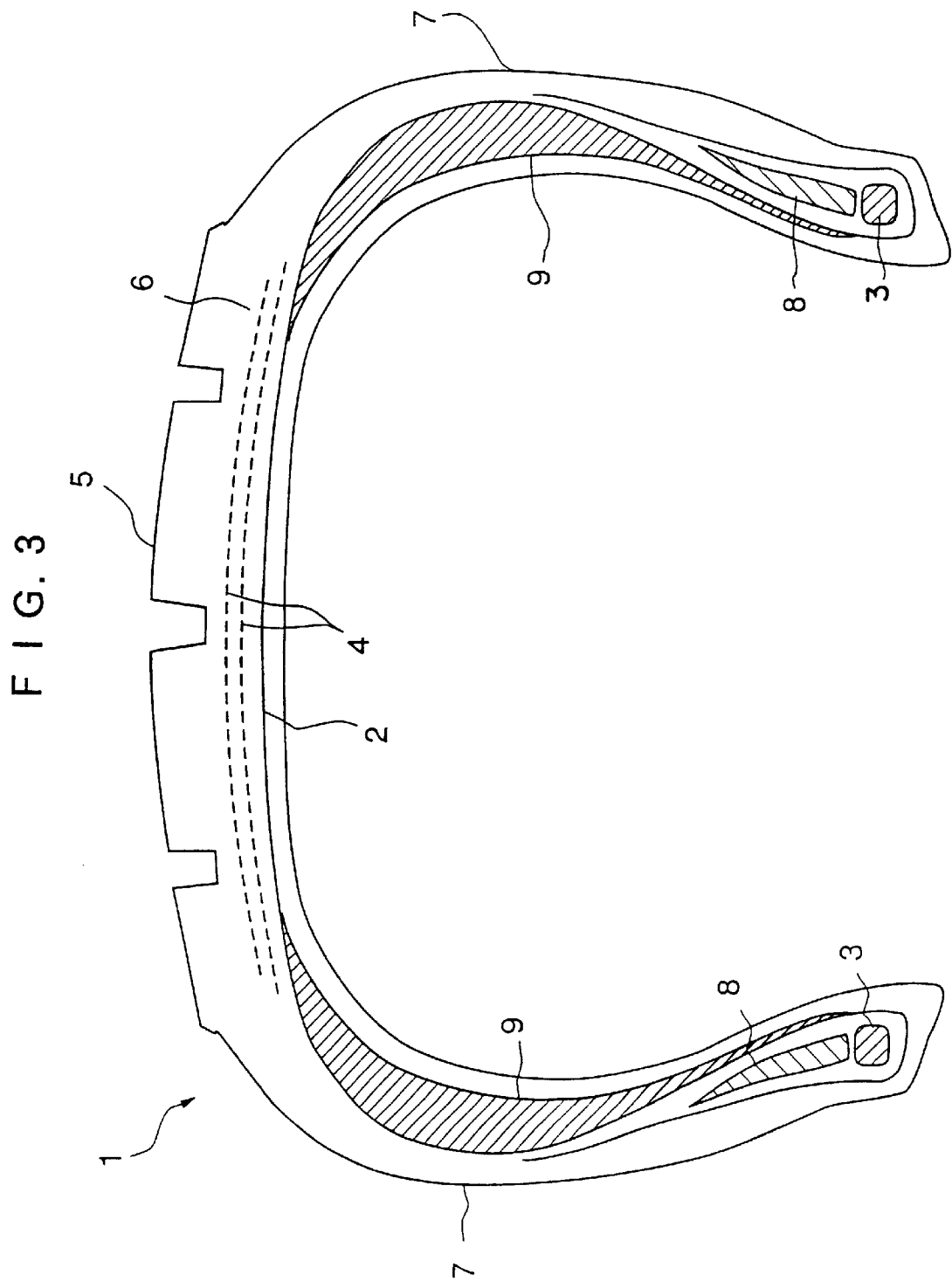

STRUCTURE 1

STRUCTURE 2

STRUCTURE 3

STRUCTURE 4

STRUCTURE 5

STRUCTURE 6

STRUCTURE 7

STRUCTURE 8

STRUCTURE 9

STRUCTURE 10

STRUCTURE 11

STRUCTURE 12

STRUCTURE 13

STRUCTURE 14

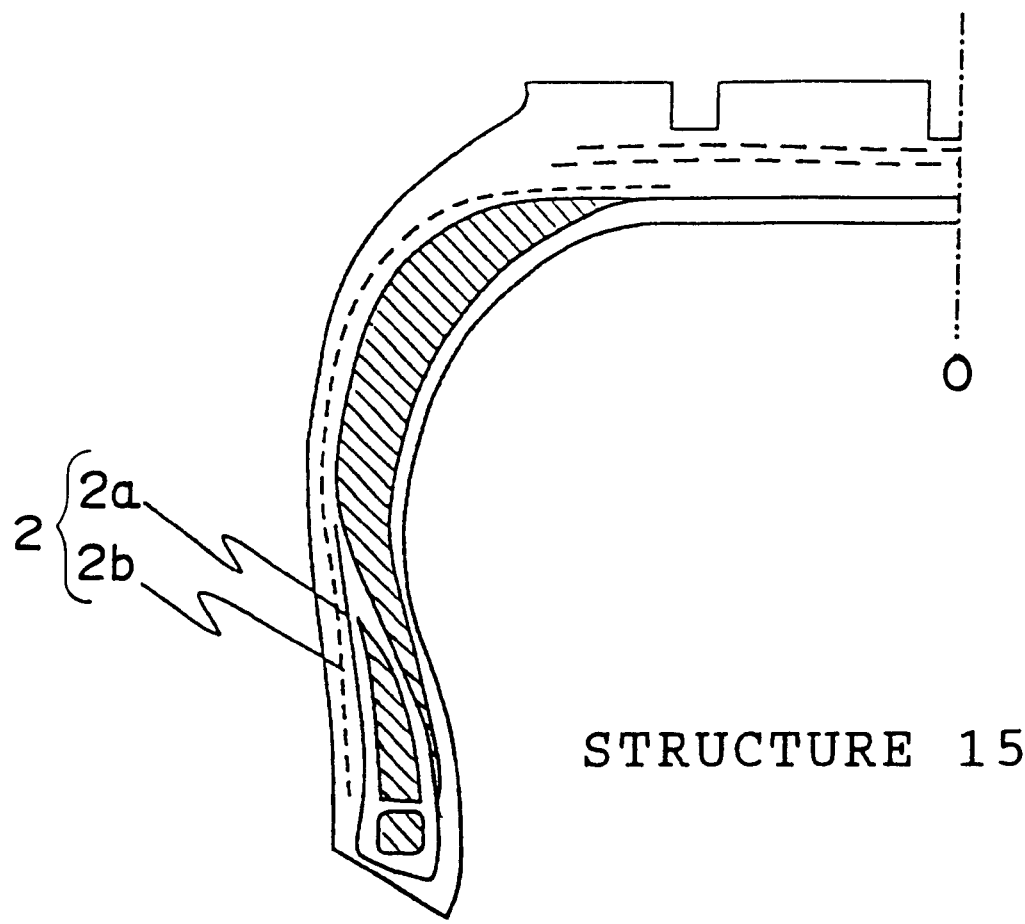
F I G. 1 4
STRUCTURE 15

STRUCTURE 16

STRUCTURE 17

STRUCTURE 18

RUBBER-STEEL CORD COMPOSITE AND PNEUMATIC TIRE FOR PASSENGER CARS

BACKGROUND OF THE INVENTION

1. Field of the Invention

The present invention relates to a rubber-steel cord composite and a pneumatic tire for passenger cars. More particularly, it relates to a rubber-steel cord composite showing excellent adhesion at high temperatures and excellent durability, and a pneumatic tire for passenger cars showing excellent durability without any adverse effect on performance in an inflated condition in which pressure inside the tire (hereinafter referred to as internal pressure) is maintained and which can be safely used under decreased internal pressure.

2. Description of the Related Art

Composites having steel cords embedded in a rubber composition are used in tires, belts and hoses. Stable adhesion between the steel cord and the rubber composition is required to increase durability. To achieve stable adhesion between the steel cord and the rubber composition, heretofore, direct adhesion in which the cord is plated with brass, i.e., an alloy of copper and zinc, and the brass-plated cord is reacted with sulfur in the rubber composition is generally conducted.

On the other hand, various attempts have been made to achieve stable adhesion by adopting a suitable structure of a steel cord.

For example, the decrease in the life of products due to corrosion of steel filaments by water that penetrates into the products has been a problem in products reinforced with steel cords. When a steel cord has a cavity, water penetrating into the steel cord through cracks formed in a product is transferred through the cavity to other portions of the steel cord in the longitudinal direction of the cord. As the result, the formation of rust due to water spreads to a wider area and adhesion of the rubber and the steel cord decreases at portions having rust. Finally, separation takes place.

To prevent such expansion of corrosion into a wider area, cord structures that allow penetration of rubber sufficiently into spaces inside the cord (spaces between metal filaments) through gaps between adjacent filaments when vulcanization is conducted under a high pressure, have been proposed.

As an examples of the above cord structure, a so-called 1+5 structure comprising one core filament and 5 sheath filaments, which contains gaps between the sheath filaments to facilitate penetration of rubber and can be produced with high productivity because the structure can be formed in a single twisting step, is disclosed in Japanese Patent Application Laid-Open No. (hereinafter abbreviated as JP-A No.) 60-38208 and JP-A No. 59-1790.

However, although the average space of the gaps is sufficient, the above structure has a drawback in that the sheath filaments are not uniformly arranged and may contain portions where filaments are tightly attached together. Therefore, portions not penetrated by rubber may be formed due to random variations of the structure of the cord in the production of the cord.

It is suggested in JP-A 56-131404 that a cord having a 1+5 structure may be formed using a core filament made to have a slightly wavy shape. However, because the diameter of the core filament is smaller than the diameter of the sheath filaments, the above structure has drawbacks in that gaps between sheath filaments are small to make the penetration of rubber difficult, that the effect obtained by the wavy shape decreases due to decreased rigidity of the core filament and that the strength decreases when the core filament is shaped to a larger degree to improve penetration of rubber.

A structure can also be considered wherein the diameter of the core filament is made larger than the diameter of the sheath filament and the gaps between adjacent sheath filaments are kept to a specific size or larger to achieve penetration of rubber into the inside of the cord. However, when this structure is used, the weight of the entire cord increases and productivity decreases. Penetration of rubber is insufficient because deviations occur in the disposal of portions of the sheath filaments, which may become attached together. Therefore, expansion of corrosion into a wider area cannot be prevented sufficiently.

As pneumatic tires that can be used under reduced internal pressure, i.e., under a so-called run-flat condition, (hereinafter referred to as pneumatic safety tires), two types of tires are known with respect to the tire wheel. One such tire is a tire of the internal wheel type, in which an internal ring wheel made of a metal or a synthetic resin is attached to a rim at a portion inside the air chamber of the tire. The other such tire is a tire of the side reinforcement type, in which a layer of a relatively rigid rubber composition is disposed in the vicinity of a carcass in an area ranging from the bead portion to the shoulder portion of the tire side wall. Of these two types, the tire of the internal wheel type has a higher ability to support a load in the run-flat condition and is used for vehicles for transportation of goods and vehicles for military use which do not require a high degree of riding comfort. The tire of the side reinforcement type is used for vehicles carrying a relatively small load and requiring a higher degree of riding comfort. Both types of tires have been accepted as tires showing useful performance.

The tire of the side reinforcement type which is suitable for a pneumatic tire for passenger cars is reinforced with a relatively rigid reinforcing rubber layer having a cross-section of a crescent shape which is disposed on an inner face of the carcass layer in the side wall portion such that one end portion thereof is placed at a position under a belt layer, with the carcass disposed between them, and the other end portion is disposed at a position over a rubber filler. When the tire has a puncture and the air inside is lost, the load is carried by the rigidity of the side wall itself which is reinforced with the reinforcing rubber layer and the tire can be used for a predetermined distance in the run-flat condition although the speed must be decreased to some degree.

However, it is the actual situation at present that, even when the tire of the side reinforcement type is used, performance of the tire is not satisfactory in the run-flat condition.

Although the load carried by a general use tire for passenger cars is relatively small, the load per one tire is as large as about 500 kgf in the case of large size passenger cars. In this case, bending of side walls increases in a punctured condition and the side walls completely buckle under a dynamic load, which increases several times during driving The punctured tire is used while this phenomenon repeatedly takes place in the tire. As the result, the bead portion in the side wall is pushed up by a flange of the rim The cover rubber and the turned-up portion of the carcass which are placed between the curved flange and the rubber filler melt by heat or are fractured. The tire in this condition cannot be used any more even after the portion of the puncture has been repaired.

When a safety tire of a size for general purposes is driven in the run-flat condition, the temperature inside the tire increases to a temperature as high as 200° C. or higher. Therefore, adhesion between rubber and fiber at a high temperature is not sufficient even when fibers having excellent heat resistance such as polyethylene terephthalate (PET) is used. Specifically in the case of a tire using PET for the carcass, the main cause of trouble during use in the run-flat condition is separation at the interface of PET and an adhesive layer. Moreover, even when a fiber showing excellent adhesion with rubber at high temperatures such as 66-Nylon is used, the surface of the cord is softened and the reinforcing effect decreases in a tire at a high temperature. Specifically in the case of a tire using 66-Nylon for the carcass, the main cause of trouble during use in the run-flat condition is separation due to melting of the surface layer of the 66-Nylon cords. Therefore, further improvement in durability in the run-flat condition is desired in both the case in which PET is used for the carcass and the case in which 66-Nylon is used for the carcass.

As the method for improving durability of the tire of the side reinforcement type in the run-flat condition, bending may be suppressed by increasing the thickness of the reinforcing rubber layer and the thickness of the bead filler to decrease the generated heat, or bending may be suppressed by increasing the number of layers in the carcass to decrease the generated heat. However, when these methods are used, the tire generally becomes more rigid and the weight of the tire increases. Therefore, performance in the inflated condition, such as rolling resistance and riding comfort during vibration, tends to become inferior and these methods are not preferable. In other words, excellent properties in the inflated condition are naturally required in combination with durability in the run-flat condition, and the above methods are not preferable.

An object of the present invention is to provide a rubber-steel cord composite showing excellent adhesion at high temperatures and excellent durability, and a pneumatic tire for passenger cars which shows no separation at the interfaces of adhesion during use, particularly during use in the run-flat condition, and exhibits excellent durability.

SUMMARY OF THE INVENTION

A steel cord constituting the rubber-steel cord composite in accordance with a first aspect of the present invention has, in a planar image of the steel cord formed by X-ray passing through the steel cord, a fraction R of the total area occupied by filaments of from 0.45 or more to 0.95 or less in an arbitrarily selected portion of the steel cord having a length of 15 mm in an axial direction of the cord, wherein the length of 15 mm in an axial direction of the cord means a length of 15 mm in an axial direction of an actual cord and the fraction R of the total area occupied by the filaments is expressed as $R=F/A$, A representing the total area of the cord and F representing the area of the cord occupied by the filaments.

By specifying the fraction of the total area occupied by the filaments in the composite as described above, penetration of rubber into inner portions of the cord is facilitated and a rubber-steel cord composite exhibiting excellent durability without adverse effects on adhesion of the rubber and the steel cord even at high temperatures can be provided.

In the rubber-steel cord composite of the present invention, it is preferable that the filaments of the steel cords are present substantially independently of each other in a matrix rubber.

In the rubber-steel cord composite of the present invention, it is also preferable that the steel cords in the composite have a 1×n structure or a 1+n structure, wherein n is in the range of $2 \leq n \leq 7$.

In the rubber-steel cord composite of the present invention, it is also preferable that the filament of the steel cords in the composite has a diameter in the range of from 0.125 to 0.275 mm.

A pneumatic tire for passenger cars in accordance with a second aspect of the present invention comprises a rubber-steel cord composite comprising a steel cord and a matrix rubber, and in a planar image of the composite formed by X-rays passing through the composite which is disposed in the tire or is taken out of the tire, a fraction R of the total area occupied by filaments of from 0.45 or more to 0.95 or less in an arbitrarily selected portion of the steel cord having a length of 15 mm in the axial direction of the cord.

The length of 15 mm in the axial direction of the cord means a length of 15 mm in the axial direction of an actual cord and the fraction R of the total area occupied by the filaments is expressed as $R=F/A$, wherein A represents the total area of the cord and F represents the area of the cord occupied by the filaments.

The pneumatic tire for passenger cars of the present invention may comprise: a pair of right and left bead cores; a carcass portion formed in a toroidal shape with a carcass ply which comprises a layer in which a plurality of cords disposed substantially parallel to each other are embedded in a matrix rubber and which has both end portions turned up around the bead cores; a belt portion comprising a plurality of layers disposed at an exterior side of the carcass portion in a radial direction of the tire; a tread portion disposed at an exterior side of the belt portion in a radial direction of the tire; and a pair of side wall portions disposed at the right and left of the tread portion.

In the pneumatic tire for passenger cars of the present invention, it is preferable that filaments of the steel cords in the rubber-steel cord composite used in the tire are present substantially independently of each other in a matrix rubber.

In the pneumatic tire for passenger cars of the present invention, it is also preferable that the steel cords in the rubber-steel cord composite used in the tire have a 1×n structure or a 1+n structure, wherein n is in the range of $2 \leq n \leq 7$.

In the pneumatic tire for passenger cars of the present invention, it is also preferable that the filament of the steel cord in the rubber-steel cord composite used in the tire has a diameter in the range of from 0.125 to 0.275 mm.

In the pneumatic tire for passenger cars in accordance with third aspect of the present invention, the portion comprising the rubber-steel cord composite of the second aspect is carcass.

In the pneumatic tire for passenger cars in accordance with the forth aspect of the present invention, the rubber-steel cord composite described in the second aspect of the present invention is disposed in the side wall portion as an insert layer.

In the pneumatic tire for passenger cars of the present invention, it is preferable that the side wall portions are reinforced with a rubber reinforcing layer.

When an organic fiber cord is used as a carcass ply cord of the pneumatic tire of the present invention, it is preferable that the organic fiber has a melting point of 245° C. or higher.

In the pneumatic tire for passenger cars of the present invention, it is preferable that the carcass ply comprises polyester cords and/or polyamide cords.

In one preferable embodiment of this pneumatic tire, the carcass comprises a turned-up ply and a down ply, both plies comprising a plurality of steel cords disposed substantially parallel to each other and a matrix rubber, and the down carcass ply is disposed between a side wall portion and an outer face of the turned-up ply, and either one of the turned-up ply and the down ply is a separate-type carcass ply which is separated into portions under the belt portion. Further, at least one layer of the turned-up carcass ply and the down carcass ply comprises the rubber-steel cord composite described in the second aspect of the invention.

The following advantages are obtained by reinforcing both of the turned-up carcass ply and the down carcass ply with steel cords and by separating either one of the carcass plies under the belt portion. An increase in the temperature of the tire is suppressed by suppressing bending during use, particularly during use in a run-flat condition. An increase in the weight of the tire due to an increase in the weight of the carcass having the steel cords is held to a minimum. Performance of the tire is maintained at a higher level under the inflated condition in comparison with that of safety tires having a conventional reinforcing rubber layer. The pneumatic tire exhibits excellent durability and excellent riding comfort.

In the third aspect of the present invention, the combination of the down carcass ply having steel cords and the turned-up carcass ply having steel cords, which is disposed at an inner side of the down carcass ply, exhibits the following effects. Bending of the tire is suppressed by the carcass comprising at least two layers of the carcass plies reinforced with steel cords, which are disposed at the side wall portion, due to the excellent tensile and bending rigidities of the layers. The decrease in the riding comfort due to the carcass comprising steel cords can be suppressed by separating one of the down carcass ply and the turned-up carcass ply into portions under the belt portion. The resistance to cuts caused by an outside source is also improved by using steel cords. Moreover, from the standpoint of the weight of the tire, the weight can be decreased in comparison with a combination of one layer of a down carcass ply having steel cords and one layer of a turned-up carcass ply having steel cords both in full length.

In the pneumatic tire in accordance with the third aspect of the present invention, it is preferable that either one of the turned-up carcass ply and the down carcass is separated into portions disposed under the belt portion with a distance of at least 20% of a width of the belt portion between the portions.

It is further preferable that the carcass comprises a layer comprising the rubber-steel cord composite described in the second aspect of the invention. The layer may be a down carcass ply or a so-called insert layer, disposed in the side wall portion.

The following advantages are obtained by using an organic fiber cord having a melting point of 245° C. or higher for one layer of the turned-up carcass ply and by disposing the rubber-steel cord composite having the specific structure at the exterior side of the above carcass as the down carcass ply. An increase in the temperature of the tire is suppressed by suppressing bending during use, particularly during use in the run-flat condition. An increase in the weight of the tire is held to a minimum. Performance of the tire is maintained at a higher level in the inflated condition in comparison with that of safety tires having a conventional reinforcing rubber layer. The pneumatic tire exhibits excellent durability.

In the present invention, the combination of the down carcass ply having the steel cords and the turned-up carcass ply having the organic fiber cords which is disposed at the inner side of the down carcass ply exhibits the following effects. To suppress bending of the tire, the carcass which has the steel cords having excellent tensile rigidity plays a role at an outer layer and the organic fiber plays a role with respect to bending of an inner layer of the tire caused by bending of the tire. The resistance to cuts caused by an outside source is also improved by using the steel cords disposed in the outer layer. Moreover, from the standpoint of the weight of the tire, the weight can be decreased in comparison with a combination of one layer of a down carcass ply having the steel cords and one layer of a turned-up carcass ply having the organic fiber cords.

The following advantages are obtained by disposing the rubber-steel cord composite having the specific structure at the side wall portions. Adhesion between the rubber and the reinforcing cords in the pneumatic tire for passenger cars does not decrease during use, particularly during use in the run-flat condition. Durability is further improved. Thus, the pneumatic tire for passenger cars exhibiting excellent durability can be provided without adverse effects on performance of the tire in the inflated condition.

The upper end portion of the rubber-steel cord composite may be disposed between an outer end portion of the belt portion and a central portion of the tread portion.

Preferably, the upper end portion of the rubber-steel cord composite covers 10% or more of an area between the outer end portion of the belt portion and the central portion of the tread portion.

The lower end portion of the rubber-steel cord composite may be disposed at a position lower than an upper end portion of a bead filler.

The rubber-steel cord composite may be disposed in such a manner that the lower end portion of the rubber-steel cord composite is disposed at a position of a lower end portion of the bead filler and an upper end portion of the composite is disposed at a position higher than an upper end portion of the bead filler, and preferably, that the rubber-steel cord composite has a length of 110% or more of a height of the bead filler.

The distance between a lower end portion of the rubber-steel cord composite and the outer end portion of the belt portion may be 25 mm or more.

BRIEF DESCRIPTION OF THE DRAWINGS

FIG. 1 is an explanatory view describing the area A of a cord in a planar image of the steel cord formed by X-rays passing through a steel cord.

FIG. 2 is an explanatory view describing the area F of a cord occupied by filaments in a planar image of the steel cord formed by X-rays passing through the steel cord.

FIG. 3 shows a sectional view of an embodiment of the pneumatic tire of the present invention.

FIG. 14 shows a schematic sectional view of a pneumatic tire (Structure 15) used in Example.

DETAILED DESCRIPTION OF THE INVENTION

Figure 4A:
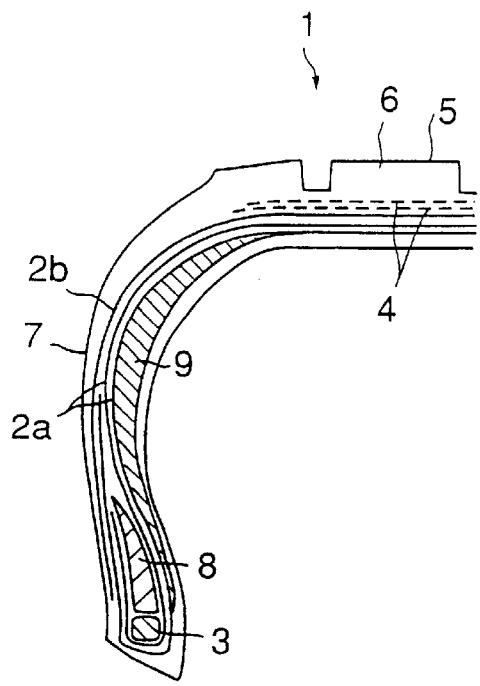
FIGS. 4A to 4E show structures of carcass plies of tires used in Example.
Figure 4B:
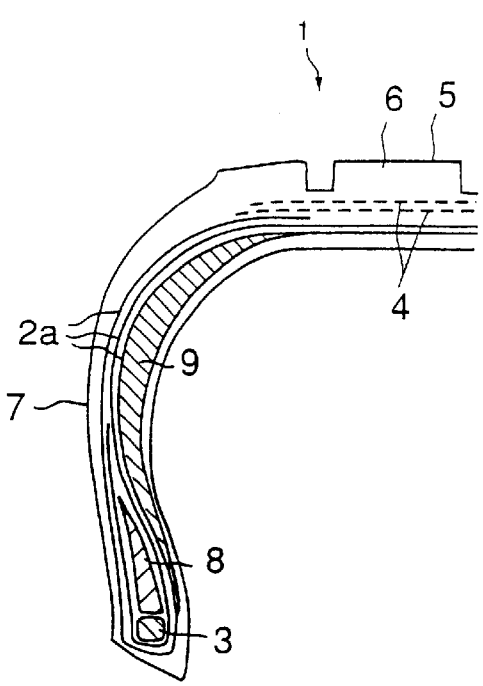
Figure 4C:
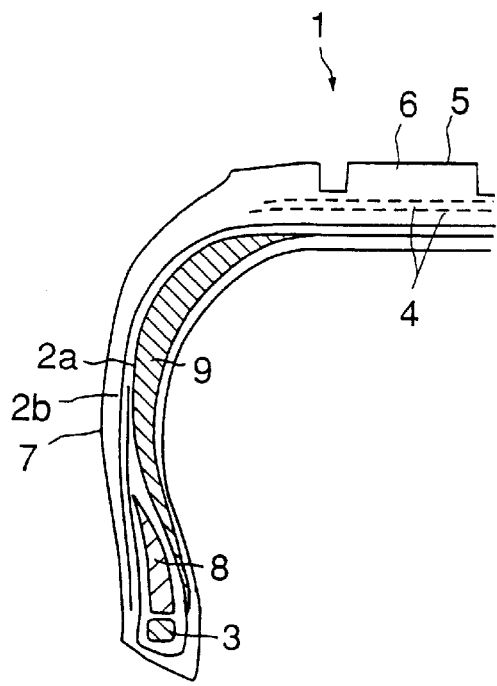
Figure 4D:
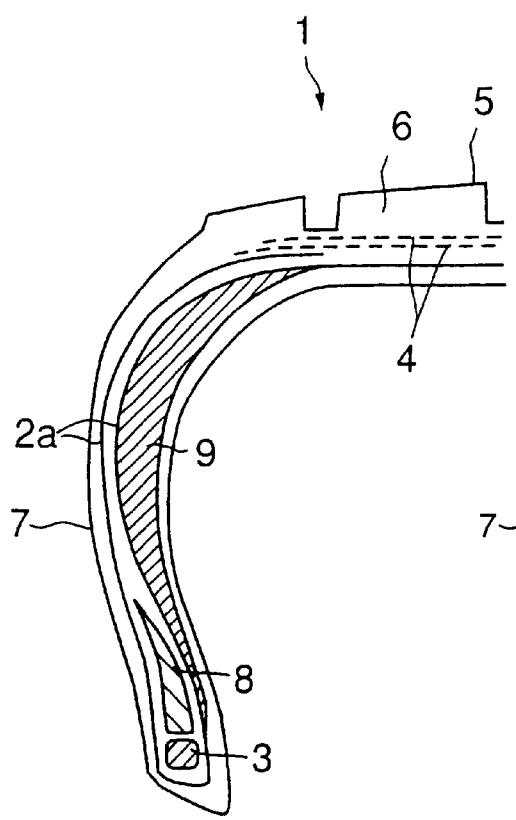
Figure 4E:
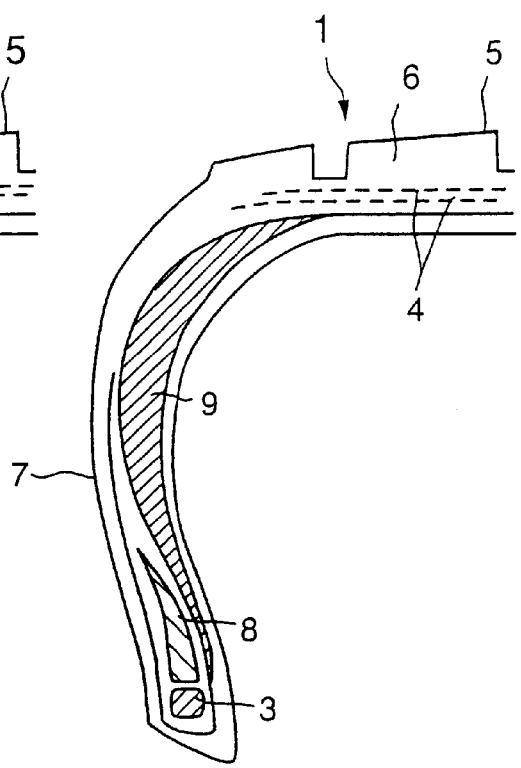

A steel cord in a rubber-steel cord composite in accordance with a first aspect of the present invention must have, in a planar image of the steel cord formed by X-rays passing through the steel cord, filaments occupying a fraction R of the total area that is from 0.45 or more to 0.95 or less in an arbitrarily selected portion of the steel cord having a length of 15 mm in the axial direction of the cord.

The length of 15 mm in the axial direction of the cord means the length of 15 mm in the axial direction of an actual cord. When the total area of the cord shown by the hatched area in FIG. 1 is represented by A and the area of the cord occupied only by filaments shown by the filled area in FIG. 2 is represented by F in the planar image of the cord shown in FIGS. 1 and 2, R is expressed as R=F/A.

For example, when the rubber-steel cord composite is used in a rubber article such as a tire, the fraction of the total area occupied by the filaments can be measured directly while the composite is in the article or after the composite has been taken out of the article.

When R is less than 0.45, tensile modulus of the cord decreases and the rigidity requirements for the carcass cannot be satisfied although the area of contact between individual filaments and matrix rubber is large and expansion of corrosion with water into a wider area can be suppressed. When R exceeds 0.95, deformation of a steel filament itself decreases and the effect of improving resistance to compression fatigue decreases. R is preferably of from 0.50 or more to 0.90 or less and more preferably from 0.55 or more to 0.75 or less.

When R is calculated, all portions that do not allow passage of the rays are projected as the filled area in the single planar image and gaps hidden behind are not recognized. Therefore, conventional steel cords having a structure which is conventionally called an open structure have an R in the range of from 0.98 to 1.00.

The rubber-steel cord composite of the present invention has an open cord structure and preferably has an open cord structure in which filaments substantially do not contact each other. The area of contact between individual filaments and matrix rubber can be changed by changing the fraction of area occupied by the filaments. Therefore, when the steel cord described above is used, penetration of water into gaps in the steel cord can be suppressed by increasing the area of contact between the filaments and the matrix rubber. Moreover, so-called fretting which is caused by friction of individual filaments with each other can be suppressed by increasing the area of contact between the filaments and the matrix rubber. As the result, expansion of corrosion with water into a wider area, which is the main cause of the decrease in durability of steel cords, can be suppressed and, moreover, corrosion caused by fretting can also be decreased remarkably.

The steel cord used in the present invention preferably has a 1×n structure or a 1+n structure and n preferably represents a natural number of 2 to 7, more preferably 3 to 6. When n exceeds 7, individual filaments tend to contact each other and there is a possibility that fretting occurs. Therefore, such a value of n is not preferable from the standpoint of durability of adhesion between the steel cord and the matrix rubber and corrosion resistance. The diameter of the filament constructing the steel cord is preferably of from 0.125 to 0.275 mm and more preferably of from 0.125 to 0.230 mm. When the diameter is less than 0.125 mm, it is difficult to stretch filaments in the production of the filament and tensile strength of the filaments may become insufficient. As a result, it is difficult to obtain sufficient tensile strength of the cord. As the result, when they are used for a so-called case member, such as carcass, of a tire, strength of the case member decreases. When the diameter exceeds 0.275 mm, resistance to fatigue becomes inferior. Therefore, such diameters are not preferable.

To manufacture the steel cord used in the present invention, for example, individual filaments are shaped to a large degree using a preformer in the step of twisting, using a twisting machine such as a tubular machine. The shaped filaments can be twisted together to form a steel cord.

The larger the degree of shaping relative to the pitch length of the filaments of the cord, the smaller the tensile stress and the larger the elongation at the breaking.

The rubber-steel cord composite of the present invention can be used for various rubber articles such as tires, belts and hoses singly or in combination with other members. The final articles can be manufactured by forming and vulcanizing in accordance with a conventional process.

In general, steel cords are tightly adhered to matrix rubber, so adhesion does not cause any problem even when heat is generated in a large amount inside the composite. For example, rubber-steel composites exhibit a more excellent durability than that of a polyethylene terephthalate (PET) cord-rubber composite. However, decreasing the heat generation in a composite is very important even if the composite exhibits the above excellent property. When a steel cord is compared, for example, with a PET cord, the steel cord has a higher bending rigidity to show a smaller amount of bending under a load and, as the result, heat generation of the composite is less. Moreover, in comparison with a conventional steel cord the above steel cord has a smaller tensile stress at a fixed degree of elongation and the degree of elongation at the breaking is relatively large. Therefore, the above steel cord exhibits remarkable improvement in resistance to compression fatigue, which is generally considered to be a major drawback of a steel cord. In other words, resistance to compression fatigue of the above steel cord can be improved remarkably because applied compression can be absorbed by deformation of the steel filaments themselves.

When the rubber-steel cord composite of the present invention is used for a tire in the run-flat condition, adhesion does not cause a problem even when heat generation in the tire is very large (troubles in the run-flat condition take place at other portions of the tire) and the performance in the run-flat condition is better than that of a tire using a PET cord or a conventional steel cord. Thus, the pneumatic safety tire of the present invention having excellent durability in the run-flat condition can be obtained by using the steel cord prepared as described above.

To exhibit the above effect more efficiently, the rubber-steel cord composite of the present invention can be used for a carcass ply of a tire.

The carcass ply reinforced with the steel cord used in the present invention can be prepared in accordance with a conventional process. The carcass ply preferably has an end count of from 25 per 5 cm to 50 per 5 cm and more preferably of from 30 per 5 cm to 45 per 5 cm. A green tire is formed by suitably using the prepared carcass plies and then carrying out vulcanization.

For a turned-up carcass ply, an organic fiber may be used. Preferably the organic fiber has a melting point of 245° C. or higher and heat stability, as the temperature of a tire becomes as high as 200° C. or higher in the run-flat condition. Examples of the organic fiber include fibers of 66-Nylon (66Ny), 46-Nylon (46Ny), polyethylene terephthalate (PET), polyethylene 2,6-naphthalate (PEN), aramide, polybenzoxazole (PBO) and polyolefin ketone (POK).

The present inventors analyzed in detail various tires of the side reinforcement type after use in the run-flat condition. As the result, it was found that the causes of the temperature increase in a tire can be narrowed to the following two phenomena. One phenomenon is the accumulation of heat generated by a so-called hysteresis loss due to the compression and elongation of rubber. The other phenomenon is the concentrated heat generation due to shearing strain formed between a side reinforcing rubber and a bead filler and/or between a side reinforcing rubber and a belt underneath a tread. When the trouble starts at the side reinforcing rubber and/or the bead filler, the first phenomenon is the major cause of the temperature increase in the tire. While the trouble starts at the carcass, the second phenomenon is the major cause. Therefore, when further improvement in durability of a tire in the run-flat condition using an organic fiber cord, such as a polyester cord and/or a polyamide cord as the reinforcing cord for the carcass ply is required, it is very important for improving durability of the carcass that concentrated formation of shearing strain formed between the side reinforcing rubber and the bead filler and/or between the side reinforcing rubber and the belt underneath the tread be suppressed.

As the method of suppressing the formation of shearing strain, it is considered to be effective that a rubber-steel cord composite having a high modulus of elasticity and excellent bending rigidity is used in the side wall portion. However, when a conventional steel cord is used, buckling fatigue or plastic deformation takes place due to the applied compression because deformation of a tire is very large during rolling of the tire, particularly during rolling of the tire in the run-flat condition.

In accordance with the above consideration, the fraction of the total area occupied by filaments in a steel cord embedded in a matrix rubber of the insert layer is limited to the specific range based on measurement in accordance with the specific method as found by the present inventors.

When a tire is used in the run-flat condition, it is preferable that two carcass plies are used in order to suppress deformation. However, when two carcass plies having steel cords are disposed under the belt, the neutral axis lies at a position between the two plies and, under a large deformation or repeated deformations, the compression strain concentrates upon one of the two plies and plastic deformation or buckling of the ply takes place. This phenomenon is not desirable. It was found that, when either one of the two plies was separated into portions under the belt to decrease the compression strain under the belt, durability in the run-flat condition is improved and the performance, particularly riding comfort, under the inflated condition is also improved. Moreover, the stick-slip property is improved. The weight of the tire can also decrease in comparison with that of the tire using complete two carcass plies having the steel cords. To obtain the above effects, the distance between separated portions of the ply is preferably at least 20% and more preferably in the range of 25 to 60% of the width of the belt.

The tires of the present invention have a reinforcing layer which may be disposed at the outer circumference of the belt layer and extended through the entire area of the belt layer, or cover end portions of the belt layer alone.

When the above rubber-steel cord composite is disposed at a side wall portion as a reinforcing layer (hereinafter referred to as the insert, occasionally), it is preferable that an upper end portion of the insert is disposed between an outer end portion of the belt and a center of a tread to effectively suppress the shearing strain which is concentrated between the side reinforcing rubber and the bead filler and/or between the side reinforcing rubber and the belt under the tread. It is more preferable that the upper end portion of the insert covers 10% or more of the area between the outer end portion of the belt and the central portion of the tread. It is also preferable that the distance between a lower end portion of the insert and the outer end portion of the belt is 25 mm or more. It is preferable that the lower end portion of the insert is disposed at a position lower than the upper end portion of the bead filler. It is more preferable that the lower end portion of the insert is disposed at a position of the lower end portion of the bead filler. Further, it is preferable that the upper end portion of the insert is disposed at a position higher than the upper end portion of the bead filler. Further, it is preferable that the insert has a length of 110% or more of the height of the bead filler.

Further, in order to suppress the shear strain between the belt and side reinforcing rubber, it is preferable that the upper end of the rubber-steel cord composite is closer to the center of the tread than that of side reinforcing rubber.

In the present invention, the rubber reinforcing layer may be disposed at the side wall portion. The shape and the disposed position of the rubber reinforcing layer is not particularly limited. It is sufficient that the rubber reinforcing layer is disposed at least at a portion of the side wall portion. The rubber reinforcing layer may also extend to the shoulder portion. A rubber reinforcing layer having a cross-section of a crescent shape may be disposed at the inner face, the outer face or both faces of the carcass layer. Particularly when the side reinforcing rubber layer having a cross-section of a crescent shape is disposed at the inner face of the carcass, durability in the run-flat condition is further improved.

The rubber component used in the matrix rubber of the rubber-steel cord composite, rubber reinforcing layer, carcass ply coating rubber, of the present invention is not particularly limited. For example, natural rubber (NR), butadiene rubber (BR), styrene-butadiene rubber (SBR) or synthetic isoprene rubber (IR) can be used. Compounding agents generally used in the rubber industry such as carbon black and other reinforcing materials, vulcanizing agents, vulcanization auxiliary agents, vulcanization accelerators, antioxidants, softeners and softening agent may suitably be used in accordance with necessity.

Physical properties of the rubber composition used for the composite are suitably selected in accordance with the application of the composite. For example, the preferable ranges of the tensile stress at 50% elongation ($M_{50}$) and the tensile stress at 100% elongation of the rubber composition are as follows: when the rubber composition is used as a carcass ply coating rubber, $M_{50}$ of 1.2 MPa to 6.0 MPa and $M_{100}$ of 3.0 MPa to 10.0 MPa are preferable for a steel cord reinforced carcass ply, while $M_{50}$ of 0.9 MPa to 30 MPa and $M_{100}$ of 1.5 MPa to 5.0 MPa are preferable for an organic fiber cord reinforced carcass ply.

When the rubber composition is used as a side reinforcing rubber layer $M_{50}$, in the range of from 2.0 to 9.0 MPa and $M_{100}$ in the range of from 4.0 to 15.0 MPa are preferable to effectively improve durability.

In the pneumatic safety tire of the present invention, at least one down carcass layer may be disposed between a side wall rubber and the outer face of the carcass layer.

EXAMPLES

The present invention is described more specifically with reference to following Examples. However, the present invention is not limited by these Examples.

Measurement of Properties

The tensile stress of a rubber composition was measured in accordance with the method of Japanese Industrial Standard K6301-1995 at 24° C. X ray was irradiated from the normal direction with respect to the surface of the rubber steel cord composite.

The hardness of the rubber composition was measured in accordance with JIS K 6301-1995 (JIS-A hardness).

The fraction of the total area occupied by the filaments was measured in accordance with the following method using K-2 manufactured by SOFTEX Co., Ltd. to obtain a planar image. The fraction of the total area occupied by the filaments was measured at 10 positions in the obtained image and the average of the obtained results was used as the fraction of the total area occupied by the filaments. When a tire had a single ply, X-rays were irradiated from the normal line direction with respect to the surface of the tire around the position of the maximum width of the tire in the tire side wall portion. When a tire had a carcass having two or more plies, images of the plies overlapped with each other and direct measurement was difficult. Therefore, one of the plies in the carcass was taken out and used for the measurement. In both cases, the measurement was conducted in accordance with the same procedures as those described above for the rubber-steel cord composite.

The retention rate of adhesion was measured in accordance with the following method: a test sample was prepared by adhering a rubber composition and steel cords by vulcanization and the steel cords in the prepared test sample were partially pulled up for a peeling test. The pulled-up steel cords and a remaining portion were each fixed between upper and lower chucks. The peeling test was conducted using a tensile tester manufactured by INSTRON Company at an extension speed of 50±5 mm per one minute. The original adhesive strength was obtained by dividing the measured value by the number of extended cords. Then, another test sample which was the same as that used above was left standing in a chamber kept at a constant temperature of 70° C. and a constant humidity of 95% for 7 days. Thereafter, the treated test sample was tested in accordance with the same procedures as those described above to obtain the adhesive strength after having been left standing in an atmosphere of higher temperature and humidity. The ratio of this adhesive strength to the original adhesive strength was used as the retention rate of adhesion.

The strength at the time of breaking and the elongation at the time of breaking of the reinforcing steel cord used for the carcass plies were measured in accordance with the method of Japanese Industrial Standard G3510-1992.

Performances of a tire were measured in accordance with the following methods.

(1) Durability in the Run-flat Condition

A tire was attached to a rim and inflated to an internal pressure of 3.0 kg/cm$^2$. The obtained assembly was left standing in a room of the temperature of 38° C. for 24 hours and then the internal pressure of the tire was released to become equal to the atmospheric pressure by removing a core of a valve of the tire A drum test of the tire was conducted under the following conditions: an applied load of 570 kg, a speed of 89 km/hour and a room temperature of 38° C. The distance driven before trouble occurred was regarded as the durability in the run-flat condition and the durability is expressed as an index based on the result of a control tire which was set at 100. The larger the index, the better the durability in the run-flat condition.

(2) Durability Under the Inflated Condition

A drum tester made of steel which had a smooth surface and a diameter of 1.707 m was used and the surrounding temperature was adjusted to 30±3° C. A rim having a size specified by the standards of Japanese Automobile Tire Manufacturers Association (JATMA) was used. A drum test of durability was conducted at the maximum internal pressure specified by the standards of JATMA under an applied load twice the maximum load specified by the standards of JATMA, and the distance driven before the tire become damaged was measured. As a criterion for practical use of the tire, the result was evaluated as poor when the distance was 20,000 km or less and as good when the distance exceeded 20,000 km.

(3) Durability Under a Wet Condition

A drum test for evaluation of durability under the wet condition was conducted under the same conditions as above (2) after 300 cc of water was injected into a test tire. The distance driven before the tire become damaged was measured. As a criterion for practical use of the tire, the result was evaluated as poor when the distance was 15,000 km or less and as good when the distance exceeded 15,000 km.

(4) Evaluation of Breaking Property of Steel Cords in Plies

A vehicle equipped with test tires was driven 300 times around a course having the shape of 8 at a speed of about 25 km/hour. The force applied to the tires in the transverse direction of the tires during the test was 0.7 G. After driving, a carcass ply in the tires was taken out and examined under an X-ray. At each of two positions under the belt along the circumference of the tire, fifty cords in the carcass ply were observed and the number of broken cords was counted. The fraction of broken steel cords was calculated and expressed as an index. The indices in the Tables are expressed on the basis of the result of a control tire which was set at 100. The smaller the number, the better the durability.

(5) The riding comfort was evaluated in accordance with the following method: the Test Sample Tires were attached to a passenger car and the riding comfort was evaluated by two professional drivers. The result was expressed by one of 1 to 10 points and the average of the points was obtained. The results of the Test Sample Tires and the Comparative Test Sample Tires were expressed as indices based on the control (Comparative Test Sample Tire 18), which was set at 100.

A formulation of a rubber composition used for a side reinforcing rubber layer is shown in Table 1 and a formulation of a coating rubber for a carcass ply is shown in Table 2 and Table 3.

TABLE 1

Formulation of a rubber composition for a side reinforcing rubber

|  | parts by weight |
|---|---|
| natural rubber | 30.0 |
| butadiene rubber[*1] | 70.0 |
| carbon black[*2] | 60.0 |
| softener[*3] | 5.0 |
| zinc oxide | 3.0 |
| stearic acid | 1.0 |
| vulcanization accelerator[*4] | 3.5 |
| antioxidant[*5] | 2.0 |
| sulfur | 5.0 |

[*1]: BR01, a trade name; manufactured by JSR Corporation
[*2]: FEF
[*3]: Spindle oil
[*4]: NOCCELOR NS, a trade name; manufactured by OUCHI SHINKO KAGAKU KOGYO Co., Ltd.
[*5]: NOCLAC 6C, a trade name; manufactured by OUCHI SHINKO KAGAKU KOGYO Co., Ltd.
$M_{50}$ = 4.5 MPa
$M_{100}$ = 10.5 MPa hardness 80

TABLE 2

Formulation of the coating rubber for the carcass ply having a high elongation steel cord

|  | parts by weight |
|---|---|
| natural rubber | 100.0 |
| carbon black[*1] | 50.0 |
| softener[*2] | 1.0 |
| vulcanization accelerator[*3] | 0.7 |
| antioxidant[*4] | 1.0 |
| zinc oxide | 5.0 |
| cobalt naphthenate[*5] | 2.0 |
| sulfur | 4.0 |

[*1]: HAF
[*2]: Spindle oil
[*3]: NOCCELOR CZ, a trade name; manufactured by OUCHI SHINKO KAGAKU KOGYO Co., Ltd.
[*4]: NOCLAC 6C, a trade name; manufactured by OUCHI SHINKO KAGAKU KOGYO Co., Ltd.
[*5]: Containing 10% of cobalt metal as the effective component
$M_{50}$ = 2.4 MPa
$M_{100}$ = 4 MPa

TABLE 3

Formulation of the coating rubber for a carcass ply having an organic cord

|  | parts by weight |
|---|---|
| natural rubber | 100.0 |
| carbon black[*1] | 40.0 |
| softener[*2] | 3.0 |
| zinc oxide | 3.0 |
| stearic acid | 1.0 |
| antioxidant[*3] | 1.0 |
| vulcanization accelerator[*4] | 0.8 |
| sulfur | 2.5 |

[*1]: HAF
[*2]: Spindle oil
[*3]: NOCLAC 6C, a trade name; manufactured by OUCHI SHINKO KAGAKU KOGYO Co., Ltd.
[*4]: NOCCELOR NZ, a trade name; manufactured by OUCHI SHINKO KAGAKU KOGYO Co., Ltd.
$M_{50}$ = 1.6 MPa
$M_{100}$ = 2.6 Mpa

Example 1

Rubber-steel cord composites were prepared by using the rubber composition for the coating rubber for a carcass ply having a formulation of Table 2. Three types of steel cords were prepared with various degrees of shaping, and the retention rates of adhesion of each of the prepared composites was measured. The results are shown in Table 4. A composite having an R of 0.98 had a conventional open structure.

TABLE 4

|  | reference composite 1 | reference composite 2 | composite 1 | composite 2 |
|---|---|---|---|---|
| Cord structure | 1 × 5 closed | 1 × 5 open | 1 × 5 open | 1 × 5 open |
| Diameter of filament | 0.15 1.00 | 0.15 0.98 | 0.15 0.81 | 0.15 0.60 |
| Retention rate of adhesion (%) | 38 | 45 | 58 | 65 |

As shown by the results in Table 4, the rubber-steel cord composites of the present invention showed better retention rates of adhesion than that of the composite having the closed structure or the conventional open structure.

Tires of size 225/60 R16 in which a reinforcing rubber layer having a cross-section of a crescent shape was disposed at the inside of the carcass ply in the side wall portion were prepared in accordance with a conventional process. The reinforcing rubber layer was prepared from a rubber composition having the formulation shown in Table 2.

The prepared tires had the following five types of carcass structures, which are shown in FIGS. 4A to 4E.

Structure 1: A 3P structure having 2 turned-up carcass plies and 1 down carcass ply disposed at the outside of the turned-up carcass plies.

Structure 2: A 2P structure having 2 turned up carcass plies, and the end portions of one of the two plies were turned up to the tread portion (enveloped structure)

Structure 3: A 2P structure having 1 turned-up carcass ply and 1 down carcass ply disposed at the outside of the turned-up carcass ply.

Structure 4: A 1P structure having 1 carcass ply in which the end portions were turned up to the tread portion (enveloped structure)

Structure 5: A 1P structure having 1 turned-up carcass ply

The tires of the present invention had a reinforcing layer which was disposed at the outer circumference of the belt layer and extended through the entire area of the belt layer, or cover end portions of the belt layer alone, although the reinforcing layer is not shown in Figures.

The structures of the test tires and the obtained results are shown in Tables 5 to 7.

TABLE 5

(U/U/D)[*1]

| Comparative Test Sample Tire | 1 | 2 | | | 3 | 4 | | |
|---|---|---|---|---|---|---|---|---|
| Test Sample Tire | | | 1 | 2 | | | 3 | 4 |
| Cord structure | 1 × 5 closed | 1 × 5 open | 1 × 5 open | 1 × 5 open | 1 × 5 closed | 1 × 5 open | 1 × 5 open | 1 × 5 open |
| Diameter of filament | 0.15 | 0.15 | 0.15 | 0.15 | 0.15 | 0.15 | 0.15 | 0.15 |
| Tire structure | 1 | 1 | 1 | 1 | 2 | 2 | 2 | 2 |
| Carcass structure | 3P | 3P | 3P | 3P | 2P | 2P | 2P | 2P |
| R | 1 | 0.98 | 0.81 | 0.60 | 1 | 0.98 | 0.81 | 0.60 |
| Durability in run-flat condition | 100 | 220 | 220 | 300 | 100 | 230 | 240 | 330 |
| Durability in inflated condition | poor | good | good | good | poor | good | good | good |
| Durability in wet condition | poor | poor | good | good | poor | poor | good | good |

[*1] U: turned-up carcass
D: down carcass ply

TABLE 6

(1P Env.)[*1]

| Comparative Test Sample Tire | 5 | 6 | | | 7 | 8 | | |
|---|---|---|---|---|---|---|---|---|
| Test Sample Tire | | | 5 | 6 | | | 7 | 8 |
| Cord structure | 1 × 5 closed | 1 × 5 open | 1 × 5 open | 1 × 5 open | 1 × 5 closed | 1 × 5 open | 1 × 5 open | 1 × 5 open |
| Diameter of filament | 0.15 | 0.15 | 0.15 | 0.15 | 0.15 | 0.15 | 0.15 | 0.15 |
| Tire structure | 4 | 4 | 4 | 4 | 5 | 5 | 5 | 5 |
| Carcass structure | 1P | 1P | 1P | 1P | 1P | 1P | 1P | 1P |
| R | 1 | 0.98 | 0.81 | 0.60 | 1 | 0.98 | 0.81 | 0.60 |
| Durability in run-flat condition | [*2]100 | 290 | 300 | 420 | [*3]100 | 290 | 320 | 460 |
| Durability in inflated condition | poor | good | good | good | poor | good | good | good |
| Durability in wet condition | poor | poor | good | good | poor | poor | good | good |

[*1] Env.: Enveloped structure
[*2] control for comparative example 6 and examples 5 and 6
[*3] control for comparative example 8 and examples 7 and 8

TABLE 7

(U/D)

| Comparative Test Sample Tire | 9 | 10 | | |
|---|---|---|---|---|
| Test Sample Tire | | | 9 | 10 |
| Cord structure | 1 × 5 closed | 1 × 5 open | 1 × 5 open | 1 × 5 open |
| Diameter of filament | 0.15 | 0.15 | 0.15 | 0.15 |
| Tire structure | 3 | 3 | 3 | 3 |
| Carcass structure | 2P | 2P | 2P | 2P |
| R | 1 | 0.98 | 0.81 | 0.60 |
| Durability in run-flat condition | [*1]100 | 280 | 290 | 400 |
| Durability in inflated condition | poor | good | good | good |
| Durability in wet condition | poor | poor | good | good |
| Fraction of broken steel cord | [*1]100 | 42 | 5 | 2 |

[*1] control

The results in the Tables show that the durability of the tires was improved by using the rubber-steel cord composite of the present invention as the carcass ply in comparison with the tires in which composites having the closed structure steel cord or the conventional open structure steel cord were used as the carcass ply. This advantage was independent of the structure of the carcass.

The reason that excellent durability was exhibited in the test along the course having the shape of an 8 can be considered to be as follows. While driving along the curved course, force is applied to the ply underneath the belt in a manner such that compression stress is locally enhanced at the inner side of the curvature, i.e., at the portion underneath the belt to which side force is applied (the inside), particularly in the vicinity of the belt end portions. Therefore, the steel cord itself is imparted with the compression force. In the case of the steel cord having the closed structure and the steel cord having the conventional open structure, which are used in the Comparative Test Sample Tires, the cords tends to break because the cords have a high rigidity under compression and the force directly works on the steel filaments. In contrast, in the case of the high elongation cord of the present invention, the compression force is absorbed by deformation of the entire cord because rubber penetrates to a larger degree and rigidity under compression is low. As the result, the force directly working on the filaments decreases and the excellent effect of increased durability can be exhibited.

Example 2

Figure 5:
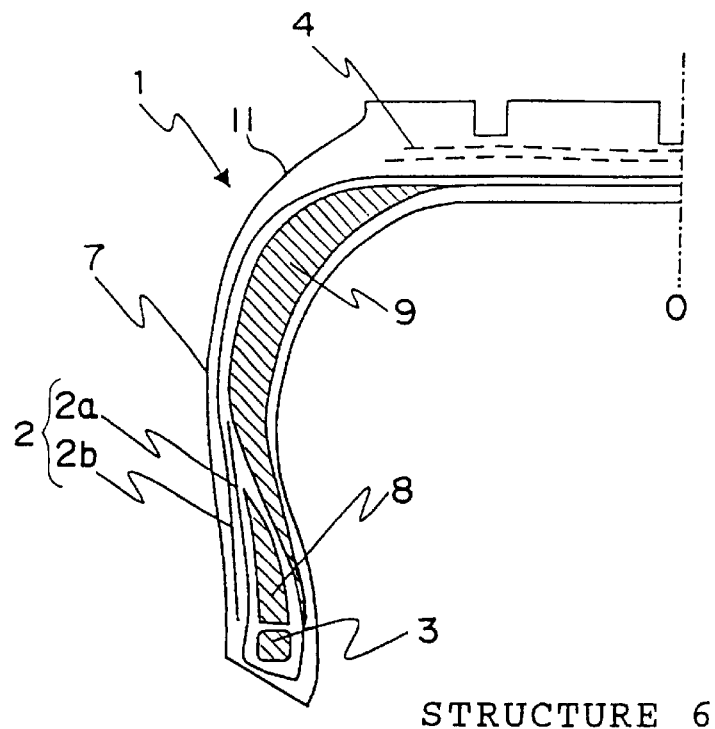
FIG. 5 shows a schematic sectional view of a pneumatic tire (Structure 6) used in Example.

The schematic sectional view in FIG. 5 shows the structures example (Structure 6) of a test tire 1 for passenger cars which had a size 225/60 R16. A carcass 2 is comprised of a first ply 2a and a second ply 2b each of which is reinforced with a cord and has a structure shown in Tables 8 and 9 and are arranged in a direction approximately perpendicular to the equator plane 0. Both end portions of the first ply 2a are turned up around bead rings 3 to form turned-up end portions. A bead filler 8 made of a rigid rubber composition is embedded between the bead ring 3, the first ply 2a and the turned-up end portion in a manner such that the bead filler has a thickness decreasing in the upward direction. The second ply 2b is a down carcass ply and both end portions thereof are disposed between a side wall rubber 7 and the outer face of the turned-up portion of the first ply 2a. An end count number of an organic fiber reinforcing carcass is 50 per 5 cm and an end count number of a steel cord reinforcing carcass is 36 per 5 cm.

At the inner circumferential face of the side wall rubber 7 of the first ply 2a, a rubber reinforcing layer 9 having a cross-section of a crescent shape is disposed in a manner such that the thickness of the side wall portion of the tire is about the same in an entire area extending from the position over the bead filler 8 via the first ply 2a to the tread shoulder 11. The rubber reinforcing layer has a maximum thickness of 13 mm. A belt 4 is comprised of two rubber sheets reinforced with steel cords having a cord structure of 1×5 and arranged in the direction oblique to the equator plane 0 at an angle of 26° such that steel cords in one sheet are arranged in a direction intersecting a direction of steel cords in a other sheet.

Figure 6:
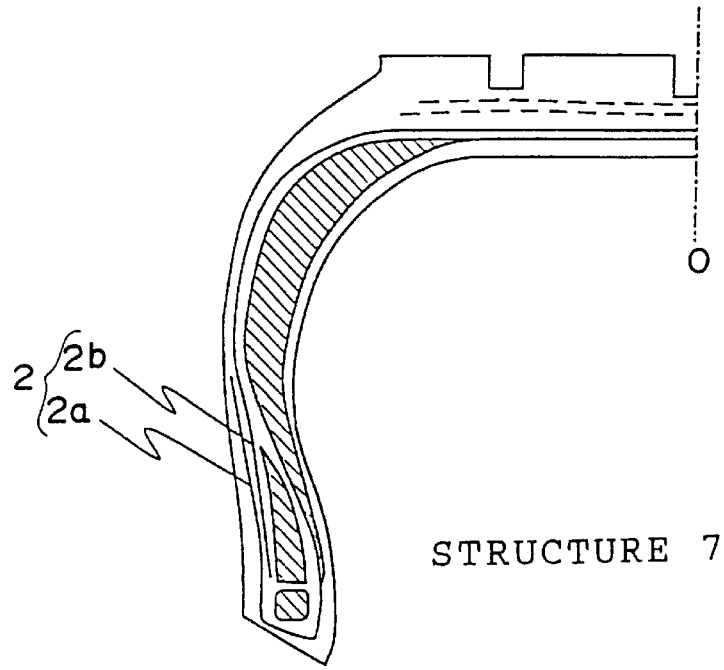
FIG. 6 shows a schematic sectional view of a pneumatic tire (Structure 7) used in Example.

Structure 7 shown in FIG. 6 is the same as Structure 6 except that the arrangement of the second ply 2b is different from that in Structure 6. Both end portions of the down carcass ply of the second ply 2b in Structure 7 are disposed between the bead filler 8 and the inner face of the turned-up portion of the first ply 2a as shown in FIG. 6.

The formulations of the rubber compositions used for the rubber reinforcing layer having a cross-section of a crescent shape, the first ply and the second ply are shown in Tables 1, 3 and 2, respectively.

The performances of the tires were measured in accordance with the same methods as those used in Example 1. For the measurement of the durability in the run-flat condition, the result obtained with the tire in comparative examples 11 and 13 were used as a control for structure 6 and structure 7 respectively.

The obtained results are shown in Tables 8 and 9.

TABLE 8

| Comparative Test Sample Tire | 11 | 12 | | | | | | |
|---|---|---|---|---|---|---|---|---|
| Test Sample Tire | | | 11 | 12 | 13 | 14 | 15 | 16 |
| Tire structure | 6 | 6 | 6 | 6 | 6 | 6 | 6 | 6 |
| First ply | | | | | | | | |
| cord material | 6Ny | 66Ny | 66Ny | PET | 46Ny | aramide | 66Ny | PEN |
| melting point (° C.) | 218 | 260 | 260 | 255 | 281 | — | 260 | 272 |
| cord structure | 1400 dtex/2 | 1400 dtex/2 | 1400 dtex/2 | 1670 dtex/2 | 1400 dtex/2 | 1670 dtex/2 | 1400 dtex/2 | 1670 dtex/2 |
| Second ply | | | | | | | | |
| cord material | steel | steel | steel | steel | steel | steel | steel | steel |
| cord structure | 1 × 5 | 1 × 5 | 1 × 5 | 1 × 5 | 1 × 5 | 1 × 5 | 1 × 5 | 1 × 5 |
| twist structure | open | closed | open | open | open | open | open | open |
| diameter of filament (mm) | 0.15 | 0.15 | 0.15 | 0.15 | 0.15 | 0.15 | 0.15 | 0.15 |
| R(F/A) | 0.6 | 1 | 0.6 | 0.6 | 0.6 | 0.6 | 0.81 | 0.6 |
| Durability in inflated condition | good | poor | good | good | good | good | good | good |
| Durability in wet condition | good | poor | good | good | good | good | good | good |
| Durability in run-flat condition | *1 100 | 130 | 180 | 180 | 210 | 200 | 160 | 205 |
| Form of trouble* | a | b | c | c | c | c | c | c |

*1 control

TABLE 9

| Comparative Test Sample Tire | 13 | 14 | | | | | | |
|---|---|---|---|---|---|---|---|---|
| Test Sample Tire | | | 17 | 18 | 19 | 20 | 21 | 22 |
| Tire structure | 7 | 7 | 7 | 7 | 7 | 7 | 7 | 7 |
| First ply | | | | | | | | |
| cord material | 6Ny | 66Ny | 66Ny | PET | 46Ny | aramide | 66Ny | PEN |
| melting point (° C.) | 218 | 260 | 260 | 255 | 281 | — | 260 | 272 |
| cord structure | 1400 dtex/2 | 1400 dtex/2 | 1400 dtex/2 | 1670 dtex/2 | 1400 dtex/2 | 1670 dtex/2 | 1400 dtex/2 | 1670 dtex/2 |
| Second ply | | | | | | | | |
| cord material | steel | steel | steel | steel | steel | steel | steel | steel |
| cord structure | 1 × 5 | 1 × 5 | 1 × 5 | 1 × 5 | 1 × 5 | 1 × 5 | 1 × 5 | 1 × 5 |
| twist structure | open | closed | open | open | open | open | open | open |
| diameter of filament (n/m) | 0.15 | 0.15 | 0.15 | 0.15 | 0.15 | 0.15 | 0.15 | 0.15 |
| R(F/A) | 0.6 | 1 | 0.6 | 0.6 | 0.6 | 0.6 | 0.81 | 0.6 |

TABLE 9-continued

| Comparative Test Sample Tire | 13 | 14 | | | | | | |
|---|---|---|---|---|---|---|---|---|
| Test Sample Tire | | | 17 | 18 | 19 | 20 | 21 | 22 |
| Durability in inflated condition | good | poor | good | good | good | good | good | good |
| Durability in wet condition | good | poor | good | good | good | good | good | good |
| Durability in run-flat condition | *100 | 130 | 190 | 185 | 220 | 205 | 160 | 200 |
| Form of trouble* | a | b | c | c | c | c | c | c |

Note:
a: The first ply melted and separated
b: The second ply was broken and deformed
c: The reinforcing rubber was broken
*control The results in Tables 9 and 10 show that the Test Sample Tires had improved durability under the inflated condition and also in the run-flat condition independently of the structure of the carcass plies.

Example 3

Figure 7:
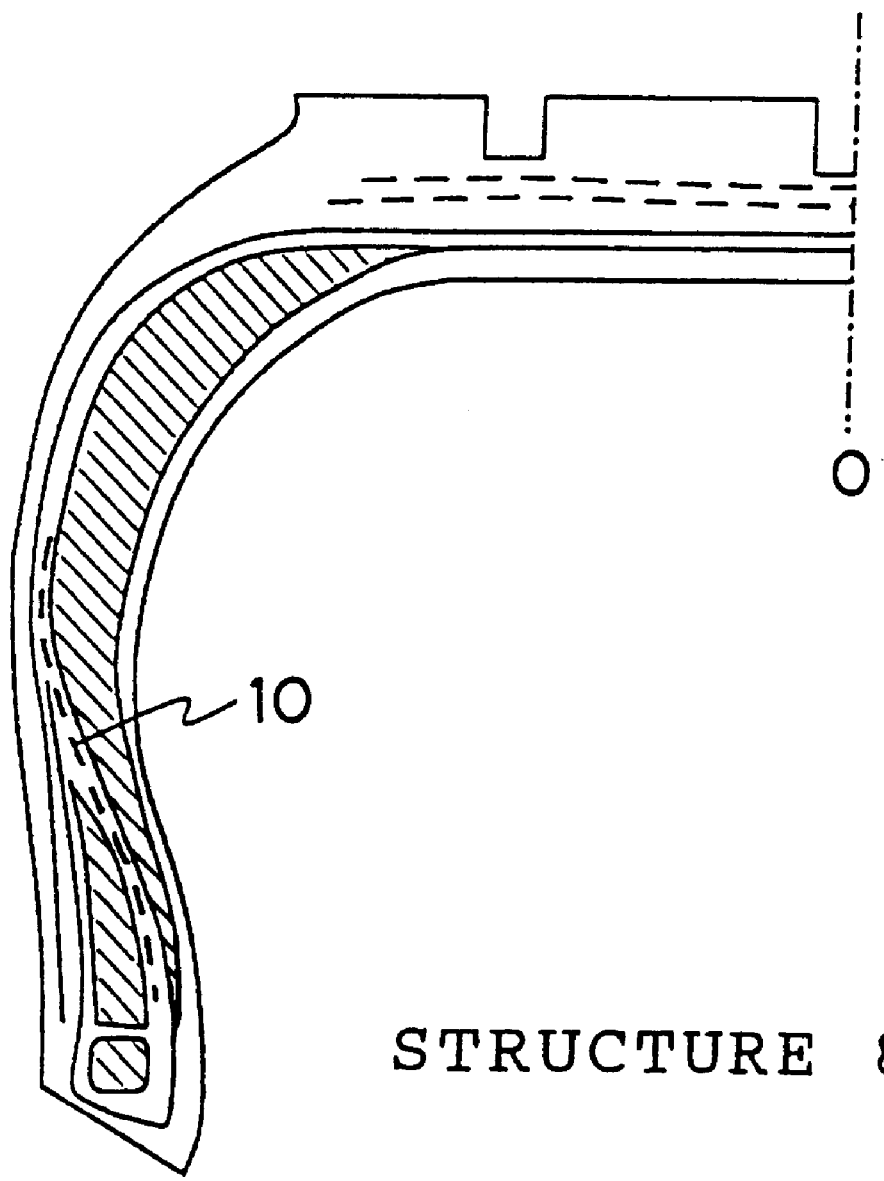
FIG. 7 shows a schematic sectional view of a pneumatic tire (Structure 8) used in Example.
Figure 8:
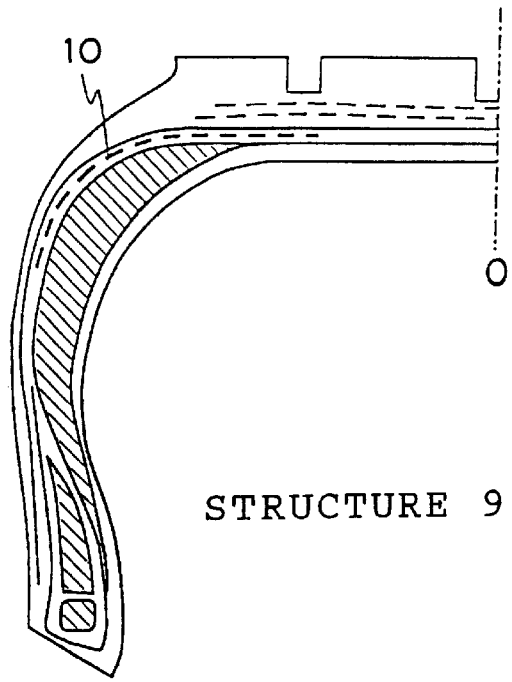
FIG. 8 shows a schematic sectional view of a pneumatic tire (Structure 9) used in Example.
Figure 9:
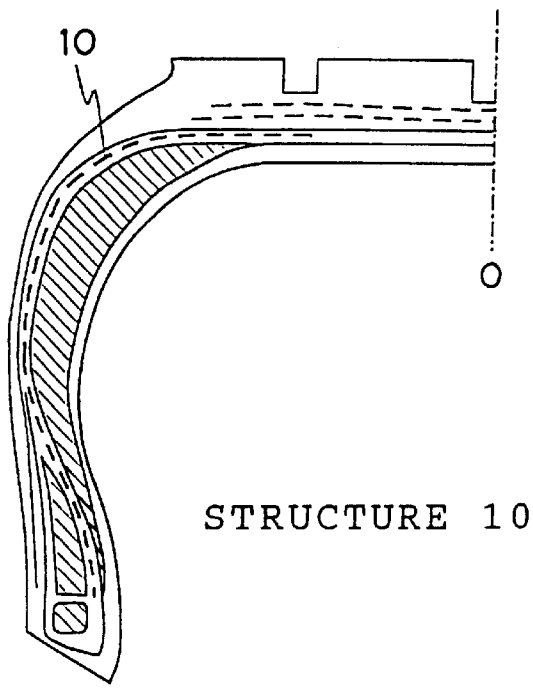
FIG. 9 shows a schematic sectional view of a pneumatic tire (Structure 10) used in Example.
Figure 10:
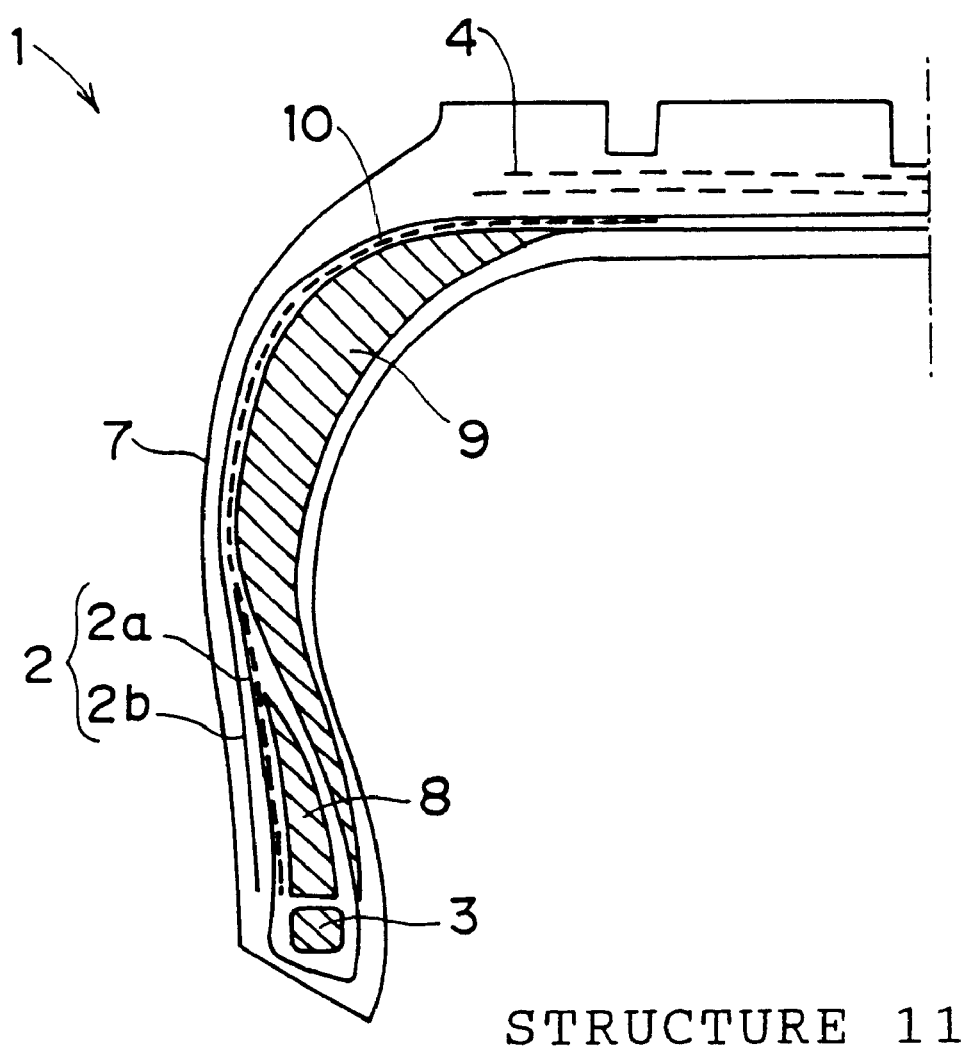
FIG. 10 shows a schematic sectional view of a pneumatic tire (Structure 11) used in Example.
Figure 11:
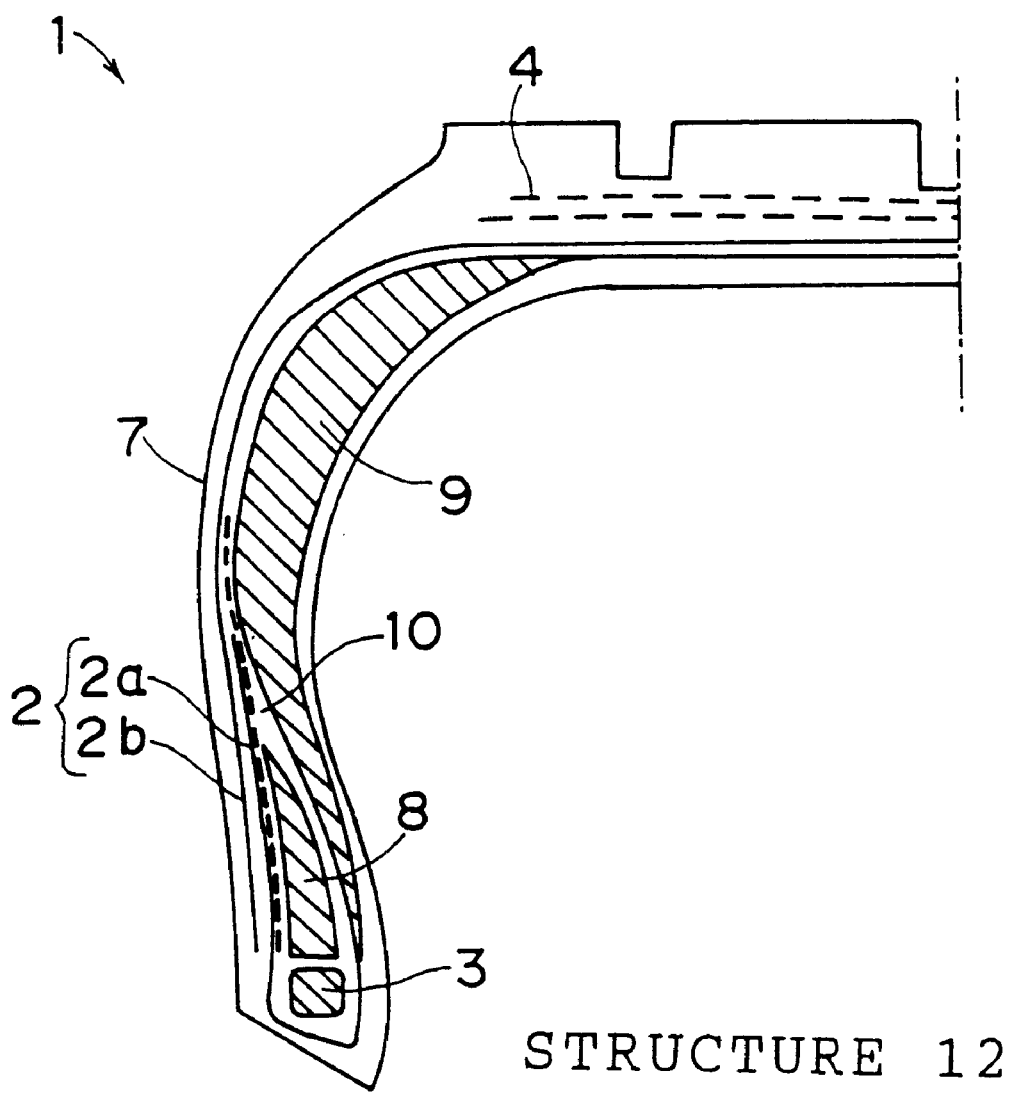
FIG. 11 shows a schematic sectional view of a pneumatic tire (Structure 12) used in Example.
Figure 12:
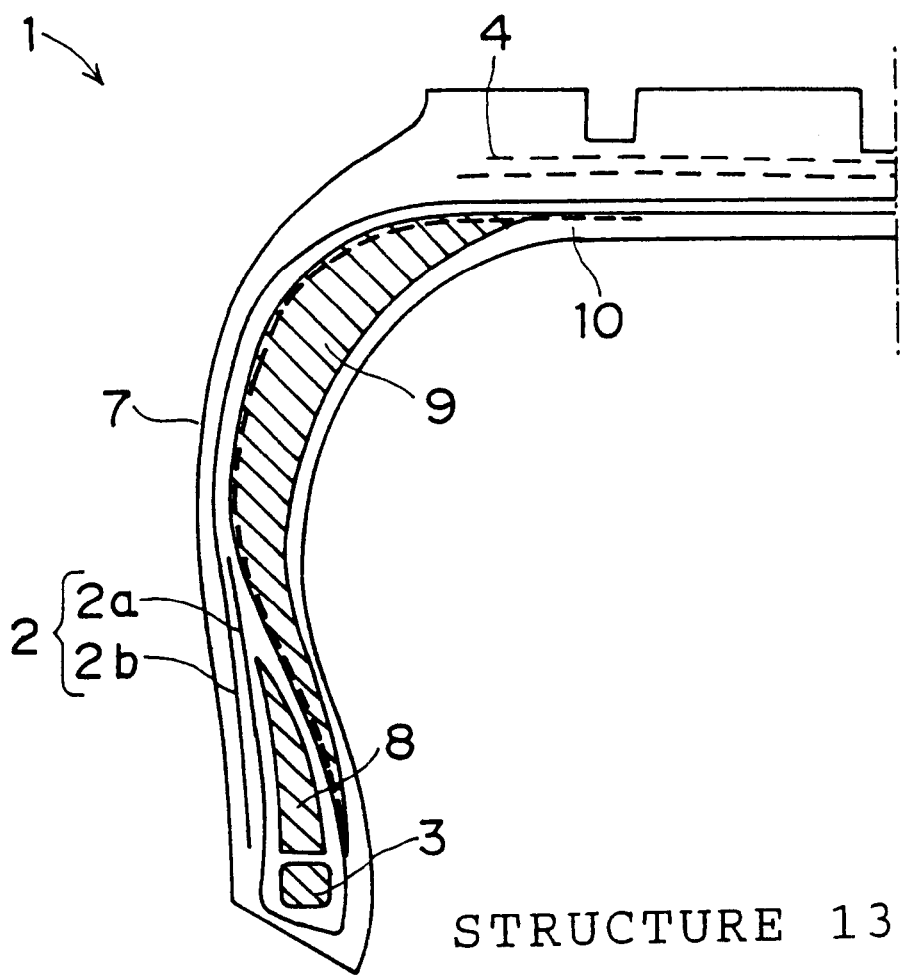
FIG. 12 shows a schematic sectional view of a pneumatic tire (Structure 13) used in Example.
Figure 13:
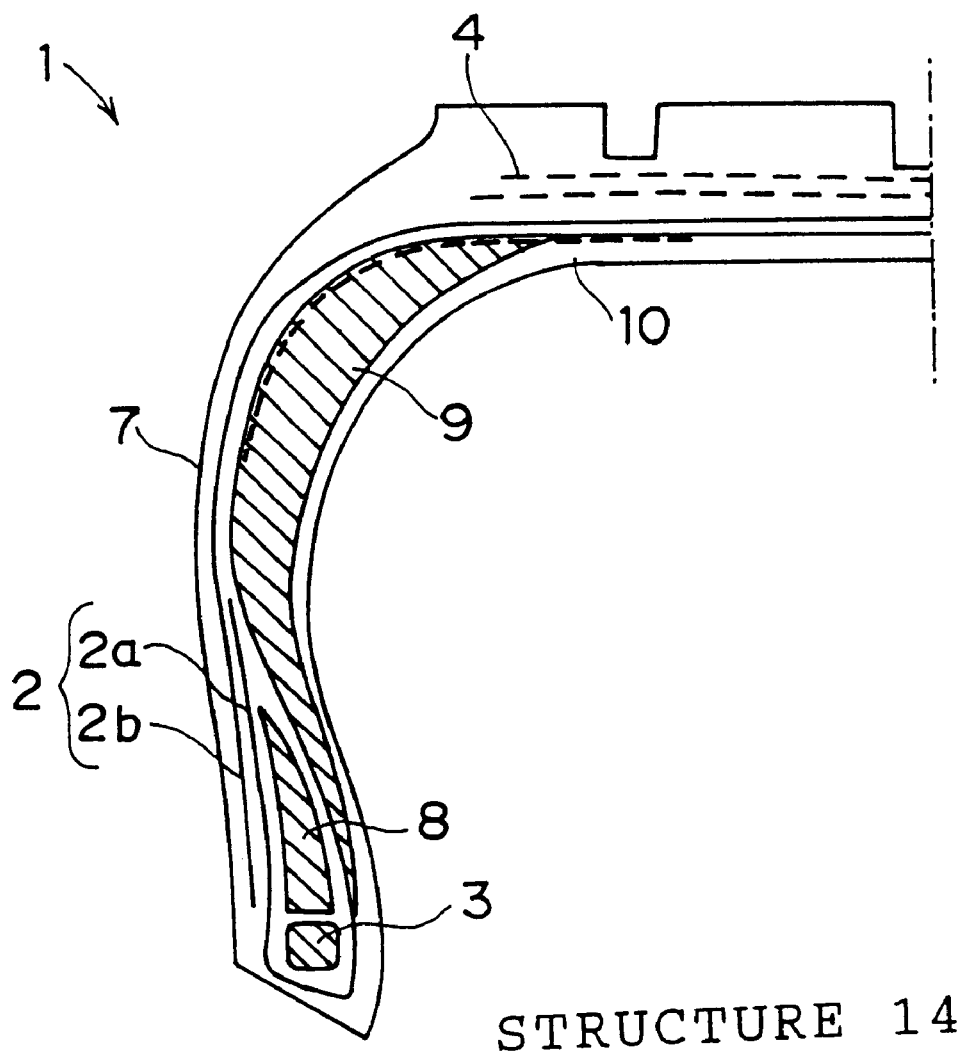
FIG. 13 shows a schematic sectional view of a pneumatic tire (Structure 14) used in Example.
Figure 15:
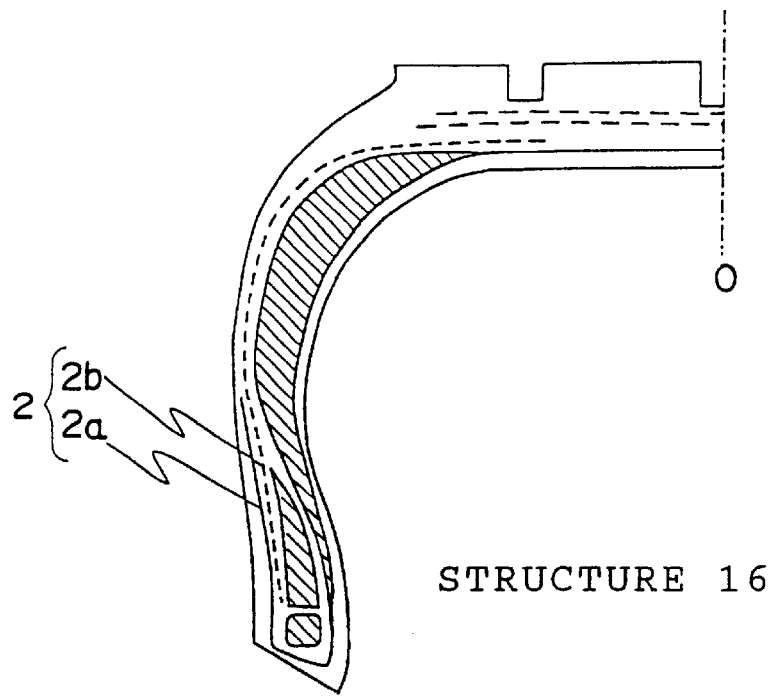
FIG. 15 shows a schematic sectional view of a pneumatic tire (Structure 16) used in Example.
Figure 16:
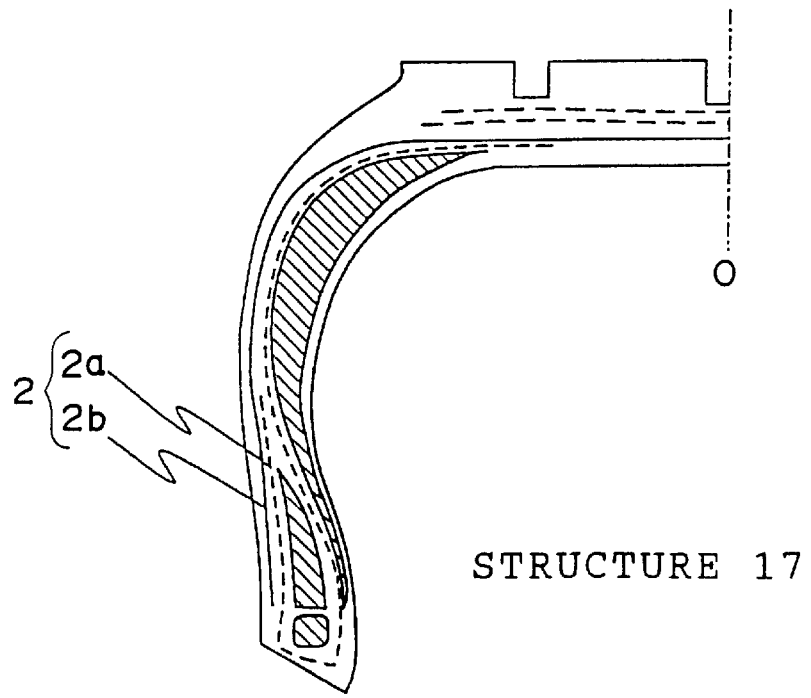
FIG. 16 shows a schematic sectional view of a pneumatic tire (Structure 17) used in Example.
Figure 17:
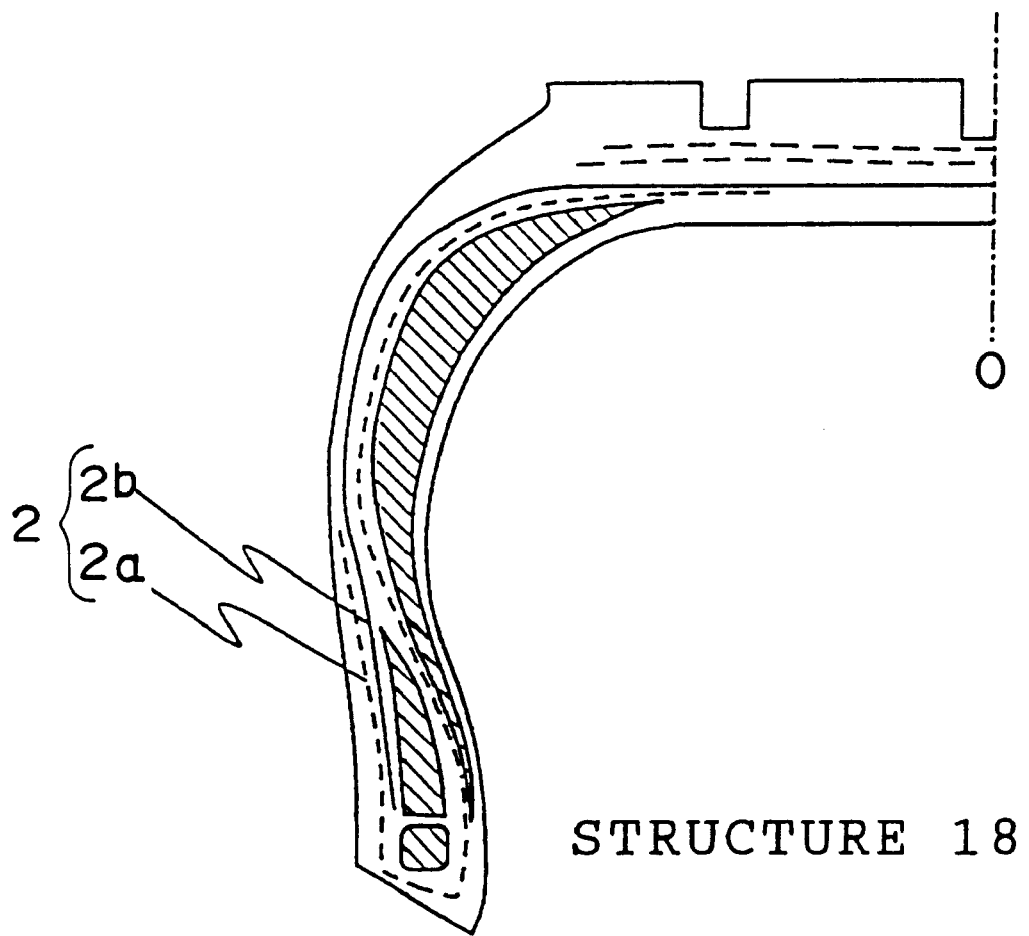
FIG. 17 shows a schematic sectional view of a pneumatic tire (Structure 18) used in Example.

The schematic sectional views in FIGS. 7 to 9 show the structure examples (Structures 8 to 10, respectively) used in the test tire 1 for passenger cars which had a size 225/60 R16. The carcass 2 is composed of the first ply 2a and the second ply 2b which have structures shown in Tables 10 to 12 and carcass ply cords are arranged in the direction approximately perpendicular to the equator plane 0. Both end portions of the first ply 2a are turned up around the bead rings 3 to form turned-up end portions. The bead filler 8 made of a rigid rubber composition is embedded between each bead ring 3, the first ply 2a and the turned-up end portion in a manner such that the bead filler has a thickness decreasing in the upward direction. The second ply 2b is a down carcass ply and both end portions thereof are disposed between the side wall rubber 7 and the outer face of the turned up portion of the first ply 2a. An end count number of an organic fiber reinforcing carcass is 50 per 5 cm and an end count number of a steel cord reinforcing carcass is 36 per 5 cm.

At the inner circumferential face of the side wall rubber 7 of the first ply 2a, a rubber reinforcing layer 9 having a cross-section of a crescent shape is disposed in a manner such that the thickness of the side wall portion of the tire is about the same in an entire area extending from the position over the bead filler 8 via the first ply 2a to the tread shoulder 11. The rubber reinforcing layer has a maximum thickness of 13 mm. The belt 4 is comprised of two rubber sheets reinforced with steel cords having a cord structure of 1×5 and arranged in the direction oblique to the equator plane 0 at an angle of 26° in a manner such that steel cords in one sheet are arranged in a direction intersecting a direction of steel cords in the other sheet.

In Structure 6 shown in FIG. 5, no insert is disposed. In Structures 8 to 10 shown in FIGS. 7 to 9, respectively, an insert 10 shown Tables 10 and 12 is disposed in manners shown in FIGS. 7 to 9.

The formulation of the rubber composition used for the rubber reinforcing layer having a cross-section of a crescent shape was the same as that of the rubber composition shown in Table 1. The formulations of the rubber compositions used in the first and the second ply, and the insert are shown in Tables 3 and 2 respectively.

The Test Sample Tires and Comparative Test Sample Tires were evaluated in accordance with the same methods as those used in Example 2.

The results obtained are shown in Tables 10 to 12.

TABLE 10

| Comparative Test Sample Tire | 15 | 16 | 17 | | |
|---|---|---|---|---|---|
| Test sample Tire | | | | 23 | 24 |
| Tire structure | 6 | 6 | 10 | 8 | 8 |
| Carcass ply | | | | | |
| cord material | PET | 66Ny | 66Ny | PET | 66Ny |
| cord structure | 1670 dtex/2 | 2100 dtex/2 | 2100 dtex/2 | 1670 dtex/2 | 2100 dtex/2 |
| Insert | | | | | |
| cord material | — | — | steel | steel | steel |
| cord structure | — | — | 1 × 5 | 1 × 5 | 1 × 5 |
| twist structure | — | — | closed | open | open |
| diameter of filament (mm) | — | — | 0.15 | 0.15 | 0.15 |
| R(F/A) | — | — | 1 | 0.6 | 0.6 |
| Durability in inflated Condition | good | good | poor | good | good |
| Durability in run-flat condition (index) | *2100 | 103 | 85 | 121 | 123 |
| Form of trouble*1 | A | B | C | D | D |

TABLE 11

| Comparative Test Sample Tire | | | | | |
|---|---|---|---|---|---|
| Test Sample Tire | 25 | 26 | 27 | 28 | 29 |
| Tire structure | 8 | 8 | 9 | 9 | 9 |
| Carcass ply | | | | | |
| cord material | PEN | 46Ny | PET | 66Ny | PEN |
| cord structure | 1670 dtex/2 | 2100 dtex/2 | 1670 dtex/2 | 2100 dtex/2 | 1670 dtex/2 |
| Insert | | | | | |
| cord material | steel | steel | steel | steel | steel |
| cord structure | 1 × 5 | 1 × 5 | 1 × 5 | 1 × 5 | 1 × 5 |
| twist structure | open | open | open | open | open |
| diameter of filament (mm) | 0.15 | 0.15 | 0.15 | 0.15 | 0.15 |
| R(F/A) | 0.6 | 0.6 | 0.6 | 0.6 | 0.6 |
| Durability in inflated condition | good | good | good | good | good |
| Durability in run-flat condition (index) | 130 | 135 | 138 | 138 | 142 |
| Form of trouble*1 | D | D | D | D | D |

TABLE 12

| Comparative Test Sample Tire | | | | | |
|---|---|---|---|---|---|
| Test Sample Tire | 30 | 31 | 32 | 33 | 34 |
| Tire structure | 9 | 10 | 10 | 10 | 10 |
| Carcass ply | | | | | |
| cord material | 46Ny | PET | 66Ny | PEN | 46Ny |
| cord structure | 2100 dtex/2 | 1670 dtex/2 | 2100 dtex/2 | 1670 dtex/2 | 2100 dtex/2 |
| Insert | | | | | |
| cord material | steel | steel | steel | steel | steel |
| cord structure | 1 × 5 | 1 × 5 | 1 × 5 | 1 × 5 | 1 × 5 |
| twist structure | open | open | open | open | open |
| diameter of filament (mm) | 0.15 | 0.15 | 0.15 | 0.15 | 0.15 |
| R(F/A) | 0.6 | 0.6 | 0.6 | 0.6 | 0.6 |
| Durability in inflated condition | good | good | good | good | good |
| Durability in run-flat condition (index) | 145 | 147 | 148 | 154 | 156 |
| Form of trouble[*1] | D | D | D | D | D |

Note:
[*1]
A: Separation of the carcass between the bead and the reinforcing rubber
B: Melting and fracture of the carcass material between the reinforcing rubber and the belt
C: Plastic deformation of the steel cord in the shoulder portion
D: Fracture of the reinforcing rubber
[*2] control The results in Tables 10 to 12 show that the Test Sample Tires had improved durability under the inflated condition and also in the run-flat condition independently of the structure of the carcass plies.

Example 4

The schematic sectional views in FIGS. 14 to 17 show the structure examples (Structures 15 to 18, respectively) used in the test tire 1 for passenger cars which had a size 225/60 R16. The carcass 2 is composed of the first ply 2a and the second ply 2b which have structures shown in Tables 13 and are arranged in the direction approximately perpendicular to the equator plane 0. Both end portions of the first ply 2a are turned up around the bead ring 3 to form turned-up end portions. The bead filler 8 made of a rigid rubber composition is embedded between each bead ring 3, the first ply 2a and the turned-up end portion in a manner such that the bead filler has a thickness decreasing in the upward direction. The second ply 2b is a down carcass ply and both end portions thereof are disposed between the side wall number 7 and the outer face of the first ply 2a. In Structure 16 shown in FIG. 15 and in Structure 18 shown in FIG. 17, both end portions of the down carcass ply are disposed between the bead filler 8 and the inner face of the turned up portion of the first ply 2a. In Structure 6 shown in FIG. 5, neither the first ply 2a nor the second ply 2b are separated into portions underneath the belt. In Structures 15 to 18, one of the first ply and the second ply is separated into portions under the belt as shown in FIGS. 14 to 17, respectively. An end count number of an organic fiber reinforcing carcass is 50 per 5 cm and an end count number of a steel cord reinforcing carcass is 36 per 5 cm.

At the inner circumferential face of the side wall rubber 7 of the first ply 2a, the rubber reinforcing layer 9 having a cross-section of a crescent shape is disposed in a manner such that the thickness of the side wall portion of the tire is about the same in an entire area extending from the position over the bead filler 8 via the first ply 2a to the tread shoulder. The rubber reinforcing layer has a maximum thickness of 13 mm. The belt 4 is comprised of two rubber sheets reinforced with steel cords having a cord structure of 1×5 and arranged in the direction oblique to the equator plane 0 at an angle of 26° in a manner such that steel cords in one sheet are arranged in a direction intersecting a direction of steel cords in the other sheet.

The formulation of the rubber composition used for the rubber reinforcing layer having a cross-section of a crescent shape was the same as that of the rubber composition shown in Table 1. The formulation of the rubber composition for the carcass ply is shown in Table 2.

Test Sample Tires and Comparative Test Sample Tires were evaluated in accordance with the same methods as those used in Example 2.

The results were expressed as an index based on the control, i.e., the result obtained with Comparative Test Sample Tire 18 and Comparative Test Sample Tire 19, which were set at 100.

The obtained results are shown in Table 13.

TABLE 13

| Comparative Test Sample Tire | 18 | 19 | | | | | 20 | |
|---|---|---|---|---|---|---|---|---|
| Test Sample Tire | | | 35 | 36 | 37 | 38 | | 39 |
| Tire structure | 6 | 6 | 15 | 16 | 17 | 18 | 6 | 15 |
| Carcass ply | | | | | | | | |
| cord material | steel | steel | steel | steel | steel | steel | steel | steel |
| cord structure | 1 × 5 | 1 × 5 | 1 × 5 | 1 × 5 | 1 × 5 | 1 × 5 | 1 × 5 | 1 × 5 |
| twist structure | closed | open | open | open | open | open | open | open |
| diameter of filament (mm) | 0.15 | 0.15 | 0.15 | 0.15 | 0.15 | 0.15 | 0.15 | 0.15 |
| R(F/A) | 1 | 0.6 | 0.6 | 0.6 | 0.6 | 0.6 | 0.81 | 0.81 |
| Durability in inflated condition | poor | good | good | good | good | good | good | good |
| Durability in wet condition | poor | good | good | good | good | good | good | good |
| Durability in run-flat condition (index) | *100 | 400 | 400 | 400 | 400 | 400 | 290 | 290 |
| Riding comfort(index) | 77 | *100 | 108 | 108 | 108 | 108 | 100 | 103 |

*control

The results in Table 13 show that the test sample tires had improved durability under the inflated condition and also in the run-flat condition independently of the structure of the carcass plies.

What is claimed is:

1. A rubber-steel cord composite comprising a steel cord having, in a planar image of the composite formed by X-rays passing through the composite, a fraction R of the total area occupied by filaments of from 0.45 or more to 0.95 or less in an arbitrarily selected portion of the steel cord having a length of 15 mm in an axial direction of the cord, wherein the length of 15 mm in an axial direction of the cord means a length of 15 mm in an axial direction of an actual cord and the fraction R of the total area occupied by the filaments is expressed as R=F/A, A representing the total area of the cord and F representing the area of the cord occupied by the filaments.

2. A rubber-steel cord composite according to claim 1, wherein the filaments of the steel cord are present substantially independently of each other in a matrix rubber.

3. A rubber-steel cord composite according to claim 1, wherein the steel cord has one of a 1×n structure and a 1+n structure, n being in a range of $2 \leq n \leq 7$.

4. A rubber-steel cord composite according to claim 1, wherein the filament constructing the steel cord has a diameter in a range of from 0.125 to 0.275 mm.

* * * * *